(12) United States Patent
Kodama et al.

(10) Patent No.: US 7,827,149 B2
(45) Date of Patent: Nov. 2, 2010

(54) ELECTRONIC APPLIANCE SERVICE SYSTEM

(75) Inventors: Shoji Kodama, Sagamihara (JP);
Kiyotake Kumazawa, Tokyo (JP);
Naoko Iwami, Sagamihara (JP); Akira Yamamoto, Sagamihara (JP); Masaaki Iwasaki, Tachikawa (JP); Atsuo Kawaguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 12/056,973

(22) Filed: Mar. 27, 2008

(65) Prior Publication Data

US 2009/0172046 A1    Jul. 2, 2009

(30) Foreign Application Priority Data

Dec. 27, 2007    (JP)    ............................. 2007-337816

(51) Int. Cl.
G06F 17/30    (2006.01)

(52) U.S. Cl. ...................................... 707/661; 709/231

(58) Field of Classification Search ................ 707/640, 707/644–648, 652–654, 661–668, 674–682; 709/220–231, 237, 238
See application file for complete search history.

(56) References Cited

U.S. PATENT DOCUMENTS

| 2002/0052957 | A1* | 5/2002 | Shimada ..................... 709/225 |
| 2004/0064579 | A1* | 4/2004 | Jennings ...................... 709/238 |
| 2004/0158870 | A1* | 8/2004 | Paxton et al. ................. 725/115 |
| 2005/0010609 | A1  | 1/2005 | Katoh et al. |
| 2008/0313402 | A1* | 12/2008 | Wong et al. .................. 711/118 |
| 2009/0043730 | A1* | 2/2009 | Lavdas et al. ................... 707/2 |
| 2010/0005531 | A1* | 1/2010 | Largman et al. .............. 726/24 |

FOREIGN PATENT DOCUMENTS

| EP | 1760593 A1 | 3/2007 |
| EP | 1783614 A1 | 5/2007 |
| JP | 2002366164 | 12/2002 |
| JP | 2005004547 | 1/2005 |
| JP | 2006013824 | 1/2006 |

* cited by examiner

Primary Examiner—Wilson Lee
(74) Attorney, Agent, or Firm—Brundidge & Stanger, P.C.

(57) ABSTRACT

The risk of a third party referring to or using backup data without authorization upon restoring such backup data in an HDD recorder is mitigated. First authentication information of a user as the HDD owner and second authentication information of an engineer of a repair plant are registered in an online backup service system. The first authentication information is used when backing up data recorded in the HDD to the online backup service system, and the second authentication information is used when restoring the data backed up to the online backup service system. The data backup processing and data restoration processing are executed only when the authentication information is appropriate. Since the user will directly receive an email from the online backup service system regarding who restored which data at what time, such user will be able to audit the data restoration process independently from the person recovering the data.

9 Claims, 22 Drawing Sheets

FIG.2

| REPAIR PLANT ACCOUNT NAME 0201 | PASSWORD 0202 | LIST OF MANUFACTURERS 0203 | COMPANY NAME 0204 | ADDRESS 0205 | TELEPHONE NUMBER 0206 | EMPLOYEE NAME 0207 |
|---|---|---|---|---|---|---|
| RA001 | PW1 | Vendor4 | Company1 | Addr1 | Tel1 | Name11, Name12 |
| RA002 | PW2 | Vendor5 | Company2 | Addr2 | Tel2 | Name21, Name22 |
| RA003 | PW3 | Vendor6 | Company3 | Addr3 | Tel3 | Name31, Name32 |
| .... | .... | .... | .... | .... | .... | .... |

FIG.3

| USER ACCOUNT NAME ⌐0301 | PASSWORD ⌐0302 | NAME ⌐0303 | ADDRESS ⌐0304 | TELEPHONE NUMBER ⌐0305 | EMAIL ADDRESS ⌐0306 |
|---|---|---|---|---|---|
| User004 | PW4 | Name4 | Addr4 | Tel4 | EmailAddr4 |
| User005 | PW5 | Name5 | Addr5 | Tel5 | EmailAddr5 |
| User006 | PW5 | Name6 | Addr6 | Tel6 | EmailAddr6 |
| ⋮ | ⋮ | ⋮ | ⋮ | ⋮ | ⋮ |

FIG.4

| USER ACCOUNT NAME ,0401 | DEVICE NAME ,0402 | MANUFACTURER NAME ,0403 | MODEL NUMBER ,0404 | DISK SPACE ,0405 | SERIAL NUMBER ,0406 |
|---|---|---|---|---|---|
| User004 | Dev41 | Vendor41 | Type41 | 500GB | Serial41 |
|  | Dev42 | Vendor42 | Type42 | 1GB | Serial42 |
| User005 | Dev5 | Vendor5 | Type5 | 1000GB | Serial5 |
| User006 | Dev6 | Vendor6 | Type6 | 800GB | Serial6 |
| ⋮ | ⋮ | ⋮ | ⋮ | ⋮ | ⋮ |

FIG.5

| AUTHORITY | USER | |
|---|---|---|
| STATUS | SERVICE UNLOCKED | 0502 |
| ACCOUNT NAME | User004 | 0503 |
| DEVICE NAME | Dev41 | 0504 |

FIG.6

| MANUFACTURER NAME | Vendor41 |
|---|---|
| MODEL NUMBER | Type41 |
| DISK SPACE | 500GB |
| DISK SPACE | Serial41 |

| TITLE NAME ~0701 | RECORDING DATE ~0702 | RECORDING TIME ~0703 | UNVIEWED FLAG ~0704 | PROGRAM DESCRIPTION ~0705 | PRODUCT PROPRIETARY INFORMATION ~0706 | DATA LOCATION ~0707 | BACKUP TIME ~0708 |
|---|---|---|---|---|---|---|---|
| Title41 | Date41 | Time41 | ON | Description41 | Proprietary 41 | Location41 | BackupTime41 |
| Title42 | Date42 | Time42 | OFF | Description42 | Proprietary42 | Location42 | BackupTime42 |
| •••• | •••• | •••• | •••• | •••• | •••• | •••• | •••• |

FIG. 8

| USER ACCOUNT NAME (0801) | DEVICE NAME (0802) | TITLE NAME (0803) | RECORDING DATE (0804) | RECORDING TIME (0805) | UNVIEWED FLAG (0806) | PROGRAM DESCRIPTION (0807) | PRODUCT PROPRIETARY INFORMATION (0808) | BACKUP TIME (0809) | DATA LOCATION (0810) | SIZE (0811) |
|---|---|---|---|---|---|---|---|---|---|---|
| User004 | Dev41 | Title41 | Date41 | Time41 | ON | Description41 | Proprietary41 | BackupTime41 | File41 | Size41 |
| | Dev41 | Title42 | Date42 | Time42 | OFF | Description42 | Proprietary42 | BackupTime42 | File42 | Size42 |
| | Dev42 | Title43 | Date43 | Time43 | ON | Description43 | Proprietary43 | BackupTime43 | File43 | Size43 |
| User005 | Dev5 | Title51 | Date51 | Time51 | OFF | Description51 | Proprietary51 | BackupTime51 | File51 | Size51 |
| User006 | Dev6 | Title61 | Date61 | Time61 | ON | Description61 | Proprietary61 | BackupTime61 | File61 | Size61 |
| .... | .... | .... | .... | .... | .... | .... | .... | .... | .... | .... |

FIG.15

| TITLE NAME 1501 | RECORDING DATE 1502 | RECORDING TIME 1503 | UNVIEWED FLAG 1504 | PROGRAM DESCRIPTION 1505 | PRODUCT PROPRIETARY INFORMATION 1506 | DATA LOCATION 1507 | BACKUP TIME 1508 | COUPON INFORMATION 1509 |
|---|---|---|---|---|---|---|---|---|
| Title41 | Date41 | Time41 | ON | Description41 | Proprietary41 | Location41 | BackupTime41 | Coupon41 |
| Title42 | Date42 | Time42 | OFF | Description42 | Proprietary42 | Location42 | BackupTime42 | Coupon42 |
| .... | .... | .... | .... | .... | .... | .... | .... | .... |

FIG.16

| 1601 | 1602 | 1603 | 1604 | 1605 | 1606 | 1607 | 1608 | 1609 | 1610 | 1611 | 1612 | 1613 |
|---|---|---|---|---|---|---|---|---|---|---|---|---|
| USER ACCOUNT NAME | TITLE NAME | RECORDING DATE | RECORDING TIME | UNVIEWED FLAG | PROGRAM DESCRIPTION | PRODUCT PROPRIETARY INFORMATION | DATA LOCATION | BACKUP TIME | DATA LOCATION | SIZE | COUPON INFORMATION | CONTENT ID |
| User004 | Dev41 | Title41 | Date41 | Time41 | ON | Description41 | Proprietary41 | BackupTime41 | N/A | N/A | Coupon41 | Content41 |
|  | Dev41 | Title42 | Date42 | Time42 | OFF | Description42 | Proprietary42 | BackupTime42 | N/A | N/A | Coupon42 | Content42 |
|  | Dev42 | Title43 | Date43 | Time43 | ON | Description43 | Proprietary43 | BackupTime43 | File43 | Size43 | N/A | N/A |
| User005 | Dev5 | Title51 | Date51 | Time51 | OFF | Description51 | Proprietary51 | BackupTime51 | File51 | Size51 | N/A | N/A |
| User006 | Dev6 | Title61 | Date61 | Time61 | ON | Description61 | Proprietary61 | BackupTime61 | File61 | Size61 | N/A | N/A |
| •••• | •••• | •••• | •••• | •••• | •••• | •••• | •••• | •••• | •••• | •••• | •••• | •••• |

FIG.17

| CONTENT ID ⌇1701 | PROVIDE NAME ⌇1702 | AUTHORIZED COUPON INFORMATION LIST ⌇1703 | DATA LOCATION ⌇1704 | SIZE ⌇1705 |
|---|---|---|---|---|
| Content41 | Provider7 | Coupon41, ... | File41 | Size41 |
| Content42 | Provider7 | Coupon42, ... | File42 | Size42 |
| ⋮ | ⋮ | ⋮ | ⋮ | ⋮ |

FIG.19

| ,1901 | ,1902 | ,1903 | ,1904 |
|---|---|---|---|
| MANUFACTURER NAME | MODEL NUMBER | CORREPONDING FORMAT | CONVERSION FORMULA OF PRODUCT PROPRIETARY INFORMATION |
| Vendor41 | Type41 | Format41 | Fomula41 |
| Vendor42 | Type42 | Format42 | Fomula42 |
| Vendor5 | Type5 | Format5 | Fomula5 |
| Vendor6 | Type6 | Format6 | Fomula6 |
| ⋮ | ⋮ | ⋮ | ⋮ |

FIG.21

| USER ACCOUNT NAME ₂₁₀₁ | DEVICE NAME ₂₁₀₂ | MANUFACTURER NAME ₂₁₀₃ | MODEL NUMBER ₂₁₀₄ | DISK SPACE ₂₁₀₅ | SERIAL NUMBER ₂₁₀₆ | SERVICE STATUS ₂₁₀₇ |
|---|---|---|---|---|---|---|
| User004 | Dev41 | Vendor41 | Type41 | 500GB | Serial41 | DATA MIGRATION SOURCE |
|  | Dev42 | Vendor42 | Type42 | 1GB | Serial42 | DATA MIGRATION DESTINATION |
| User005 | Dev5 | Vendor5 | Type5 | 1000GB | Serial5 | BACKUP IN PROGRESS |
| User006 | Dev6 | Vendor6 | Type6 | 800GB | Serial6 | RESTORATION IN PROGRESS |
| •••• | •••• | •••• | •••• | •••• | •••• | •••• |

ELECTRONIC APPLIANCE SERVICE SYSTEM

CROSS REFERENCES

This application relates to and claims priority from Japanese Patent Application No. 2007-337816, filed on Dec. 27, 2007, the entire disclosure of which is incorporated herein by reference.

BACKGROUND

The present invention relates to a service of backing up data recorded in an electronic appliance such as an HDD (Hard Disk Drive) recorder, which is used for recording TV programs and the like, to an online backup service system via the Internet, and, if the HDD recorder malfunctions, recovering the data recorded in the HDD recorder using the data backed up to the online backup service system in addition to repairing the HDD recorder at a repair plant.

Conventionally, technology of backing up data in a PC to an external recording medium, replacing the HDD when the HDD in the PC malfunctions, and restoring the backed up data in the PC is widely known. Remote copy technology of copying data among storage apparatuses is also widely known.

Meanwhile, if the HDD recorder malfunctions, the HDD recorder is returned to the user in a status where only the hardware is repaired, and in most cases the data that was stored in the HDD recorder is lost. In this case, the user has no choice but to acquire the backup data from a media or an online storage, and use such acquired data to recover the data that was stored in the HOD recorder. Users of an HDD recorder do not all have a good command of the PC or storage apparatus, and there are users who are unfamiliar with the handling of electronic appliances. Thus, it would be much more convenient for the user if the data recovery process of HDD recorders is performed by an engineer of the repair plant together with the repair of the HDD recorder.

SUMMARY

Nevertheless, in order to realize the foregoing service with convention technology, such service would be based on the premise that the operator who will recover the data and the user who owns the data have some kind of confidential relationship. In other words, if the operator who will recover the data is ill-intentioned, there is a problem in that such operator may refer to or use the data without authorization.

For instance, when normally using an online storage service, a user account name of the service user and a corresponding password are required. In order to recover data, it is necessary to relay such information to a third party. There is a possibility that the password will be leaked when relaying the information, and the service will be misused through use of the leaked password.

Thus, an object of the present invention is to provide an electronic appliance service system capable of mitigating the risk of a third party referring to or using backup data without authorization upon restoring such backup data in an electronic appliance.

In order to achieve the foregoing object, the present invention provides an electronic appliance service system in which an information service unit for backing up information concerning an electronic appliance authenticates the electronic appliance in association with first authentication information, the electronic appliance sends a backup request including the first authentication information to the information service unit upon backing up the recorded information, and the information service unit that received the backup request discriminates the backup request and backs up the information recorded in the electronic appliance as well as authenticates the electronic appliance under an information recording unit for repair or the like in association with second authentication information based on information from the information recording unit. Upon receiving a restoration request including the second authentication information from the foregoing electronic appliance, the information service unit discriminates the restoration request and restores the information backed up in association with the first authentication information in the electronic appliance under the control of the information recording unit.

According to the present invention, it is possible to mitigate the risk of a third party referring to or using backup data without authorization upon restoring such backup data in an electronic appliance.

DESCRIPTION OF DRAWINGS

FIG. 2 is a configuration diagram of a repair plant account DB according to the first embodiment of the present invention;

FIG. 3 is a configuration diagram of a user account DB according to the first embodiment of the present invention;

FIG. 4 is a configuration diagram of a backup device registration table according to the first embodiment of the present invention;

FIG. 5 is a configuration diagram of service unlocking information according to the first embodiment of the present invention;

FIG. 6 is a configuration diagram of device information according to the first embodiment of the present invention;

FIG. 7 is a configuration diagram of a data management table according to the first embodiment of the present invention;

FIG. 8 is a configuration diagram of a backup catalog according to the first embodiment of the present invention;

FIG. 15 is a configuration diagram of a data management table according to the second embodiment of the present invention;

FIG. 16 is a configuration diagram of a backup catalog according to the second embodiment of the present invention;

FIG. 17 is a configuration diagram of a content management table according to the second embodiment of the present invention;

FIG. 19 is a configuration diagram of an inter-product correspondence table according to the first embodiment of the present invention;

FIG. 21 is a configuration diagram of a backup device registration table according to the third embodiment of the present invention.

DETAILED DESCRIPTION

First Embodiment

Figure 1:
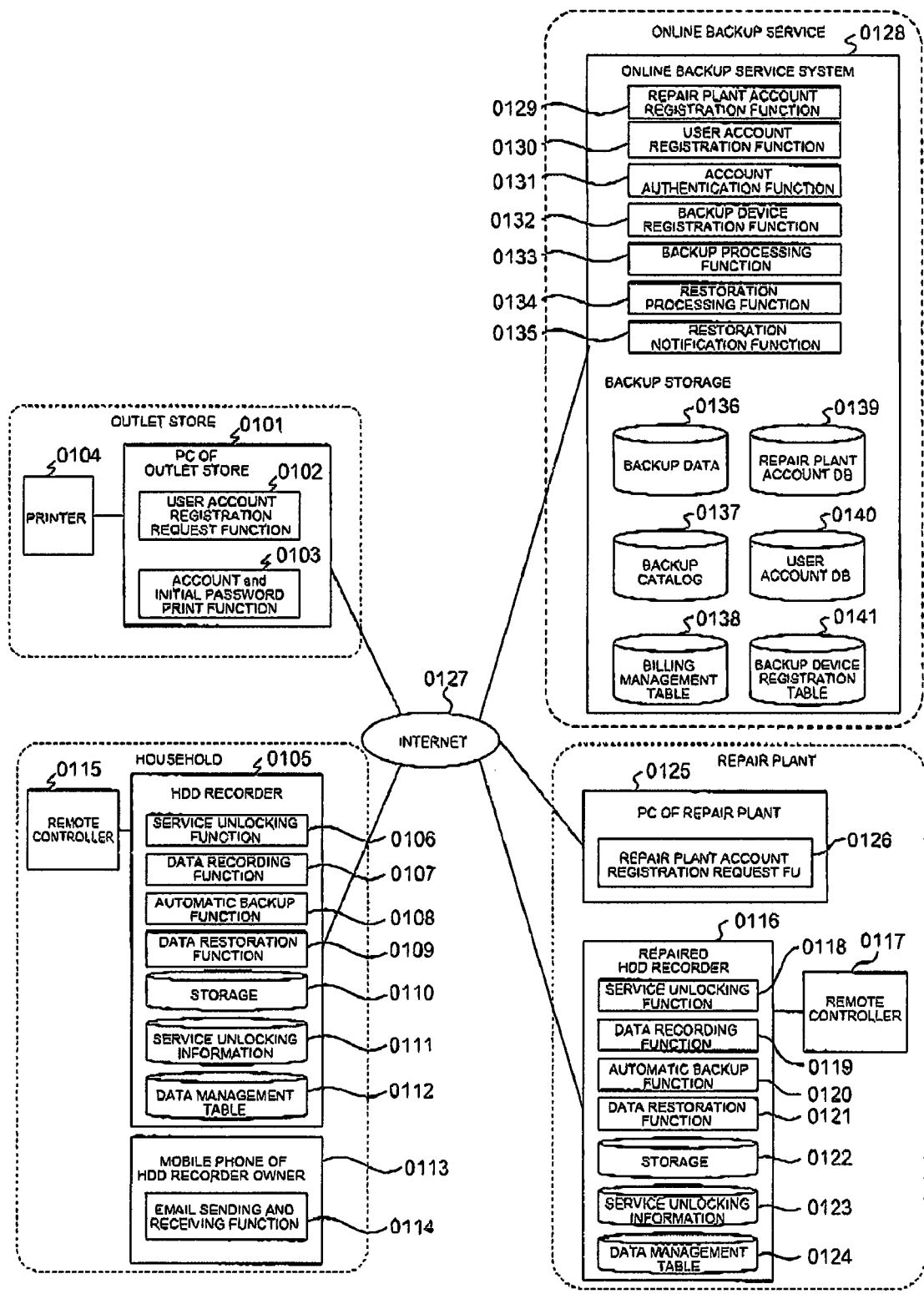
FIG. 1 is a system configuration diagram showing the first embodiment of the present invention.

The first embodiment of the present invention is now explained with reference to the attached drawings. This embodiment realizes an HDD (Hard Disk Drive) recorder repair service system including data restoration. FIG. 1 shows the outline of the system configuration.

The service provided by this service system includes backing up the data recorded in an HDD recorder used by a user subscribing to the service to an online backup service system via a network, and, if the HDD recorder malfunctions, repairing the HDD recorder at a repair plant and thereafter restoring the data recorded in the HDD recorded from the online backup service system to the repaired HDD recorder at the repair plant, and then returning the HDD recorder to the user. This service may also include the service of copying or migrating the data recorded in an old HDD recorder installed at home to a new HDD recorder purchased at an outlet store.

This system is configured as an electronic appliance service system by comprising an outlet store PC (PERSONAL COMPUTER) 0101 installed in the outlet store, an HDD recorder 0105 installed in a household, a mobile phone 0113 of the HDD recorder owner, a repair plant PC 0125 installed in the repair plant, an HDD recorder 0116 installed in the household that is a repaired version of the malfunctioned HDD recorder 0105, and an online backup service system (information service unit) 0128.

These constituent features are mutually connected via a network 0127 such as the Internet. In other words, this configuration enables the transfer of information among the outlet store PC, the HDD recorder 0105 installed in the household, the mobile phone 0113, and the repair plant PC through the network 0127. Although not shown, the outlet store PC, the HDD recorder 0105 installed in the household, the mobile phone 0113, the repair plant PC, and the repaired HDD recorder 0116 ordinarily exist in a plurality.

Each PC is equipped with an input means (not shown) such as a mouse or a keyboard, and also includes a communication apparatus for communicating with the Internet, a storage apparatus storing table structure data and database data described later and programs for realizing the functions shown in the control flow, a processing unit (CPU) for processing data stored in the memory, received data and input data using the foregoing programs, and a communication line such as a bus for mutually connecting the foregoing components.

The outlet store PC 0101 includes a user account registration request function 0102 and an account and initial password printing function 0103. The outlet store PC 0101 is also connected to a printer 0104.

The HDD recorder 0105 includes a service unlocking function 0106, 0118, a data recording function 0107, 0119, an automatic backup function 0108, 0120, and a data restoration function 0109, 0121. The [HDD recorder 0105] also includes service unlocking information 0111, 0123 and a data management table 0112, 0124 as management information. Recorded data and management information are stored in a storage 0110, 0122 in the HDD recorder.

The HDD recorder 0105, 0116 is operated with a remote control 0115, 0117, and a TV or the like is used for the screen display. The backup target appliance is not limited to an HDD recorder, and the present invention can be applied to any electronic appliance such as a mobile phone, a PDA or a PC that is capable of loading the foregoing functions (i.e., any electronic appliance including a communication function and a function for recording information).

Moreover, there is no particular limitation in the backup target data upon applying the present invention and, in addition to TV programs, the backup target data may be music or emails, address books, files or the like. The HDD recorder includes an input apparatus (not shown) for receiving TV broadcast signals, an output apparatus for outputting visual and audio signals to the TV or the like, a communication apparatus for communicating with the Internet, a storage apparatus such as an HDD (Hard Disk Drive) for recording TV program data and the like, a storage apparatus for storing the table structure data and database data described later (specifically, service unlocking information and a data management table) and programs that realize functions shown in the control flow (specifically, service unlocking function, data recording function, automatic backup function, data restoration function and so on), a processing unit (CPU) for processing data in the memory, received data and input data with the foregoing programs, and a communication line such as a bus for mutually connecting the foregoing components.

The mobile phone of the HDD recorder owner includes an email sending and receiving function 0114. The repair plant PC (information recording unit) includes a repair plant account registration request function 0126.

The online backup service system 0128 comprises, as information service units, a repair plant account registration function 0129, a user account registration function 0130, an account authentication function 0131, a backup device registration function 0132, a backup processing function 0133, a restoration processing function 0134, and a restoration notification function 0135.

The online backup service system 0128 comprises, as management information, a repair plant account DB (database) 0139, a user account DB 0140, a backup device registration table 0141, a backup catalog 0137, and a billing management table 0138 for managing the monthly billing charges according to the backup data volume for each user account.

The online backup service system 0128 includes a storage 0136 for storing backup data and management information. The online backup service system is configured from an online backup server and a storage system (not shown), and these components are connected via a Fibre Channel network or the like.

The online backup server includes a communication apparatus for communicating with the Internet, a management terminal for managing a server, an I/O interface apparatus for reading and writing data from and into the storage system, a storage apparatus for storing the table structure data and database data described later (specifically, a repair plant account DB, a backup catalog, a user account DB, a billing management table, and a backup device registration table) and programs for realizing the functions shown in the control flow (specifically, a repair plant account registration function, a user account registration function, an account authentication function, a backup device registration function, a backup processing function, a restoration processing function, and a restoration notification function), a processing unit (CPU) for processing data in the memory, received data and the input data with the foregoing programs, and a communication line such as a bus for mutually connecting the foregoing components.

The storage system includes a management terminal for managing a storage, a plurality of HDDs configured in RAID (Redundant Array Of Independent Disks) format for storing backup data, an I/O interface apparatus for inputting and outputting data to and from the server, a storage apparatus for storing programs that process data I/O requests from the server, a processing unit (CPU) for processing data in the memory, received data and input data with the foregoing programs, and a communication line such as a bus for mutually connecting the foregoing components.

The management table to be used is explained below. FIG. 2 shows an example of the repair plant account DB 0139. This table includes information such as a repair plant account name 0201, a password 0202, a list of manufacturers 0203, a company name 0204, an address 0205, a telephone number 0206, and an employee name 0207.

Each entry exists for each repair plant or for each employee of the repair plant. With a repair plant that has a plurality of manufacturers in charge, a repair plant account may be separately set for each manufacturer. The following explanation is based on a case where one repair plant account exists for each repair plant.

The repair plant account name 0201 is an ID for differentiating the repair plants. The password 0202 is used for confirming whether the account user is legitimate. The list of manufacturers 0203 is a list of manufacturers whose products the repair plant can repair. Normally, a repair plant exists for each manufacturer, and an exclusive repair plant of a manufacturer is only able to repair products of that manufacturer. The company name 0204, the address 0205, and the telephone number 0206 are information for specifying the repair plant. The employee name 0207 is the name of the employee who will perform the repair.

FIG. 3 shows an example of the user account DB 0140. This table is configured from a user account name 0301, a password 0302, a name 0303, an address 0304, a telephone number 0305, and an email address 0306.

The user account name 0301 is an ID for specifying the service subscriber upon subscribing to the service. This service is the data restoration service if the HDD recorder malfunctions. This embodiment also considers a case where the service subscriber owns a plurality of HDD recorders, and such HDD recorders are backed up with a single user account. The name 0303, the address 0304, and the telephone number 0305 specify the service subscriber, and are used for billing the service usage fee.

The email address 0306 is used by the online backup service company to directly access the user without going through the outlet store or the repair plant. The password 0302 is used for confirmed whether the account user is legitimate.

FIG. 4 shows an example of the backup device registration table 0141. This table is configured from a user account name 0401, a device name 0402, a manufacturer name 0403, a model number 0404, a disk space 0405, and a serial number 0406.

The user account name 0401 is the user account name of the user who subscribed to the service. The device name 0402 is a name that is allocated personally by the user to the HOD recorder 0105 to which the user wishes to back up data. The device name 0402 is used for facilitating the process of designating from which HDD recorder the backup data is to be restored when the user owns a plurality of HOD recorders. The manufacturer name 0403 and the model number 0404 are information for specifying the HDD recorder product.

In certain restoration services, there is a business model that does not allow restoration unless it is the same product, and the foregoing information is used for determining whether the appliance that backed up data and the restoration destination appliance are the same product. The disk space 0405 shows the capacity of the HDD mounted on the HDD recorder 0105. The serial number 0406 is a unique number allocated to the HDD recorder 0105 manufactured by the manufacturer of the HDD recorder 0105.

Even if the user forgets the user account name 0401 or the device name 0402, since the correspondence of the serial number unique to the HDD recorder and the data backed up from the HDD recorder is managed in the online backup service system, if the serial number 0406 is known, it will be possible to decide which data is to be restored. Normally, since the malfunctioned HDD recorder 0105 is carried into the repair plant when it needs to be repaired, the serial number 0406 can be specified from such HDD recorder 0105.

FIG. 5 shows an example of the service unlocking information 0111. This table is configured from an authority 0501, a status 0502, an account name 0503, and a device name 0504.

There are two types of services available to the user; namely, a service for performing backup and restoration of the stored data based on user authority (corresponds to the automatic backup function and the restoration function of the HDD recorder function), and a service for performing restoration of only +data based on the repair plant authority (corresponds to the restoration function of the HDD recorder function). Which function is available will depend on the authority. The authority 0501 shows the authority at the time of service unlocking, and is either set with no value, or set to a status of "user" or "repair plant." A value is not set at the time of product shipment or repair.

If the value is "user," the automatic backup function or the restoration function from the HDD recorder 0105 can be executed. If the value is "repair plant," only the restoration function can be executed. The status 0502 is set to a value of either "service locked" or "service unlocked." The value of "service locked" is set at the time of product shipment or repair. If the value is "service locked," the automatic backup function or the restoration function of data will not function. If the value is "service unlocked," the automatic backup function or the restoration function can be used based on the status 0502. The account name 0503 shows under which account name the service unlocking request was authenticated. The device name 0504 is an arbitrary name to be given by the user to the backup target appliance.

FIG. 6 shows an example of the device information. This table is configured from a manufacturer name 0601, a model number 0602, a disk space 0603, and a serial number 0604. The foregoing information is recorded in a ROM or the like of the product, and is used upon registering the backup device in the online backup service system 0128 at the time of service unlocking.

FIG. 7 shows an example of the data management table 0112. This table is configured from a title name 0701, a recording date 0702, a recording time 0703, an unviewed flag 0704, a program description 0705, product proprietary information 0706, a data location 0707, and a backup time 0708.

The title name 0701 is the title of the recorded TV program, and can be acquired from EPG information. EPG (Electronic Program Guide) information refers to the electronic program guide. The recording date 0702 and the recording time 0703 show when and how long the program was recorded. The unviewed flag 0704 shows whether the user viewed the program after having recorded such program. The program description 0705 is information describing the contents of the program, and can be acquired from EPG information.

The product proprietary information 0706 shows the metadata concerning the content that differs per product. For instance, there is protection configuration information to disable the deletion of the content, or a view count of the content. Information from the title name 0701 to the product proprietary information 0706 is referred to content metadata, and such information is also a backup target. The data location 0707 records where in the storage built-in the HDD recorder the program data was stored. The backup time 0708 shows the time that the data was backed up, and the backup time column is left blank in the case of a new data that has not yet been backed up.

FIG. 8 shows an example of the backup catalog 0137. This table is configured from a user account name 0801, a device name 0802, content metadata 0803 to 0808, a backup time 0809, a data location 0810, and a size 0811.

The user account name 0801 and the device name 0802 shows from which user's which device the data was backed up. The content metadata 0803 to 808 shows information that is managed by the data management table. The backup time 0809 is the time that the data was backed up. The data location 0810 and the size 0811 show where in the backup storage (or under what kind of file name) the backup data was stored, and how much capacity it is consuming.

The processing flow for realizing the HDD recorder repair service system with data restoration is now explained by being dividing into (A) repair plant account registration processing, (B) service registration processing, (C) automatic backup processing, and (D) data restoration processing.

(A) Repair Plant Account Registration Processing

The employee of the repair plant registers the repair plant account in the online backup service system 0128. The online backup service system 0128 implements the data restoration to the HDD recorder 0116 by the employee of the repair plant only when the repair plant account (second authentication information) is authenticated.

The repair plant account registration is realized by the following functions working together. The repair plant PC 0125 includes a repair plant account registration request function. This is a function for requesting the repair plant account registration to the online backup service system 0128.

The online backup service system 0128 includes a repair plant account registration function. This is a function for registering the repair plant account in the repair plant account DB 0139.

Figure 9:
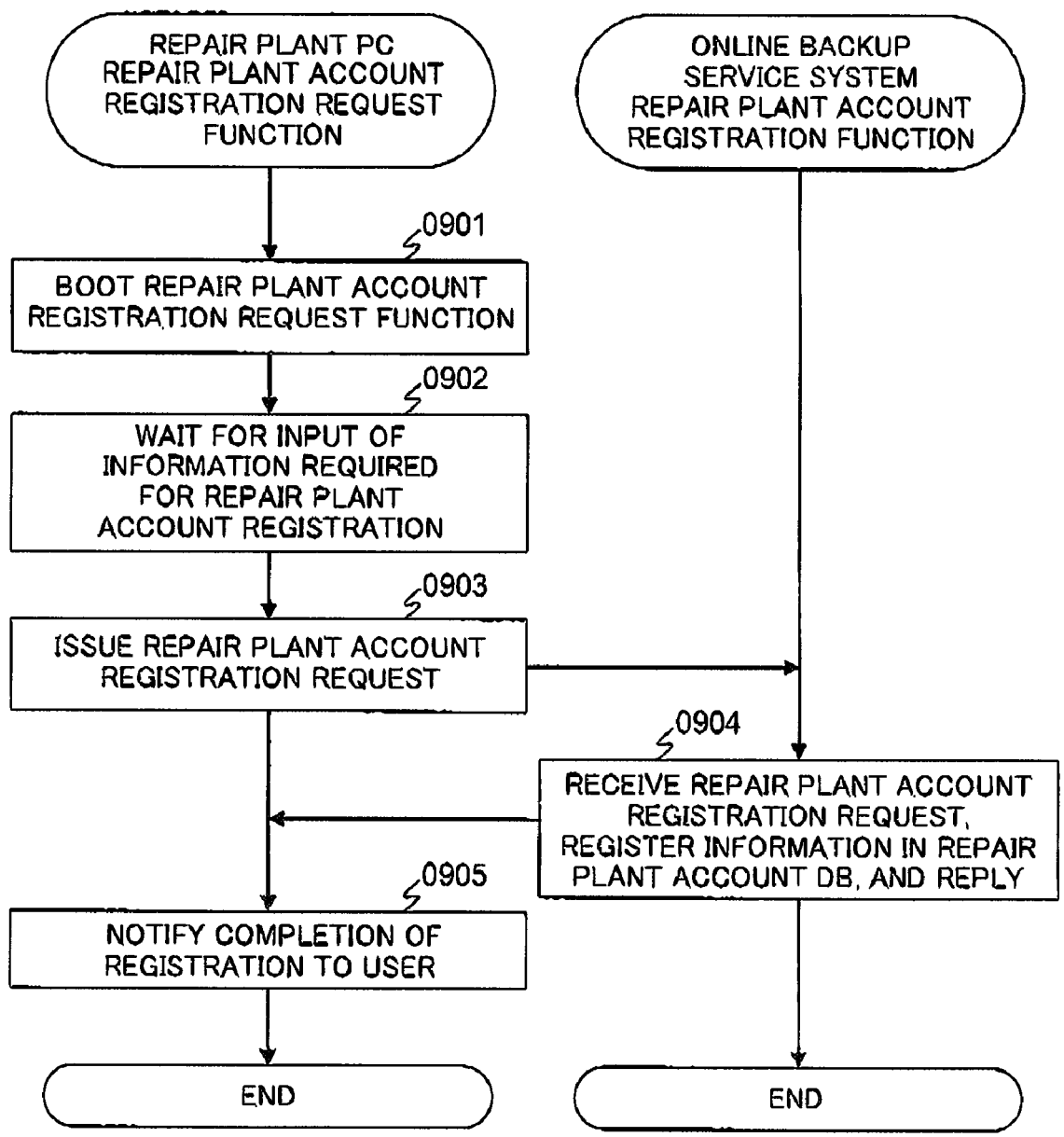
FIG. 9 is a flowchart explaining repair plant account registration processing according to the first embodiment of the present invention.

The processing flow for registering the repair plant account is now explained with reference to FIG. 9.

Step 0901: The employee of the repair plant executes the repair plant account registration request function with the repair plant PC 0125.

Step 0902: The employee of the repair plant inputs into the repair plant account registration request function a repair plant account name, a password, a list of manufacturers whose products can be repaired, a company name of the repair plant, an address, a telephone number, a list of names of employees who will perform the repair, and then press the submit button.

Step 0903: The repair plant account registration request function communicates with the online backup service system 0128 via the Internet 0127, and sends the input information.

Step 0904: The repair plant account registration function of the online backup service system 0128 registers the received information in the repair plant account DB 0139, and replies to the repair plant PC 0125.

Step 0905: The repair plant account registration request function of the repair plant PC 0125 notifies the employee of the repair plant that the registration is complete by displaying such completion of registration on the PC screen.

(B) Service Registration Processing

If the user requests the subscription of the data restoration service upon purchasing the. HDD recorder 0105, the outlet store of the HDD recorder 0105 uses the outlet store PC 0101 to perform user account registration in the online backup service system 0128. The user is able to use the data automatic backup service and the data restoration service if the HDD recorder malfunctions by inputting the user account and password upon using the HDD recorder as well as the device name of the HDD recorder 0105 to be backed up. The online backup service system 0128 provides these services only if the user account is authenticated.

The user account registration is realized by the following functions working together. The outlet store PC 0101 includes a user account registration request function and an account and initial password printing function. The user account registration request function is a function for requesting the user account registration to the online backup service system 0128. The account and initial password printing function is a function for printing the created user account name and the initial password issued by the online backup service system 0128 for the user account on a sheet of paper with a printer.

The online backup service system 0128 includes a user account registration function, an account authentication function, and a backup device registration function. The user account registration function is a function for creating a new user account in the user account DB 0140, and deciding and issuing an initial password. The account authentication function is a function for authenticating the user account and the repair plant account. The backup device registration function is a function for differentiating and registering the device to be backed up.

The HDD recorder 0105 includes a service unlocking function. The service unlocking function is a function for the user to start using the automatic backup service and the data restoration service. At the time of product shipment, among the service unlocking information of the HDD recorder 0105, the authority, the account name, and the device name are left blank, and the status is set to "service locked."

Figure 10:
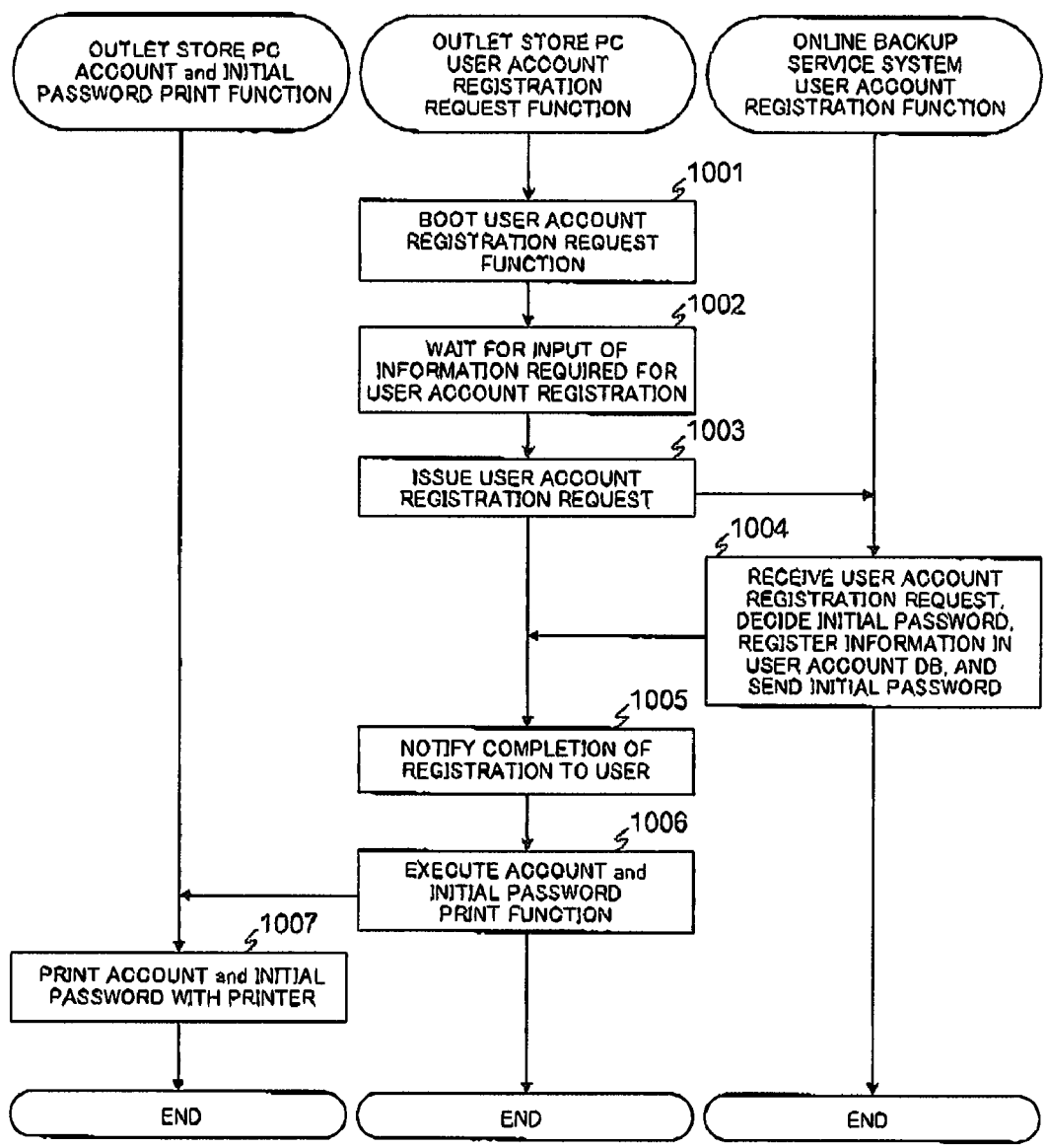
FIG. 10 is a flowchart explaining service registration processing according to the first embodiment of the present invention.
Figure 11:
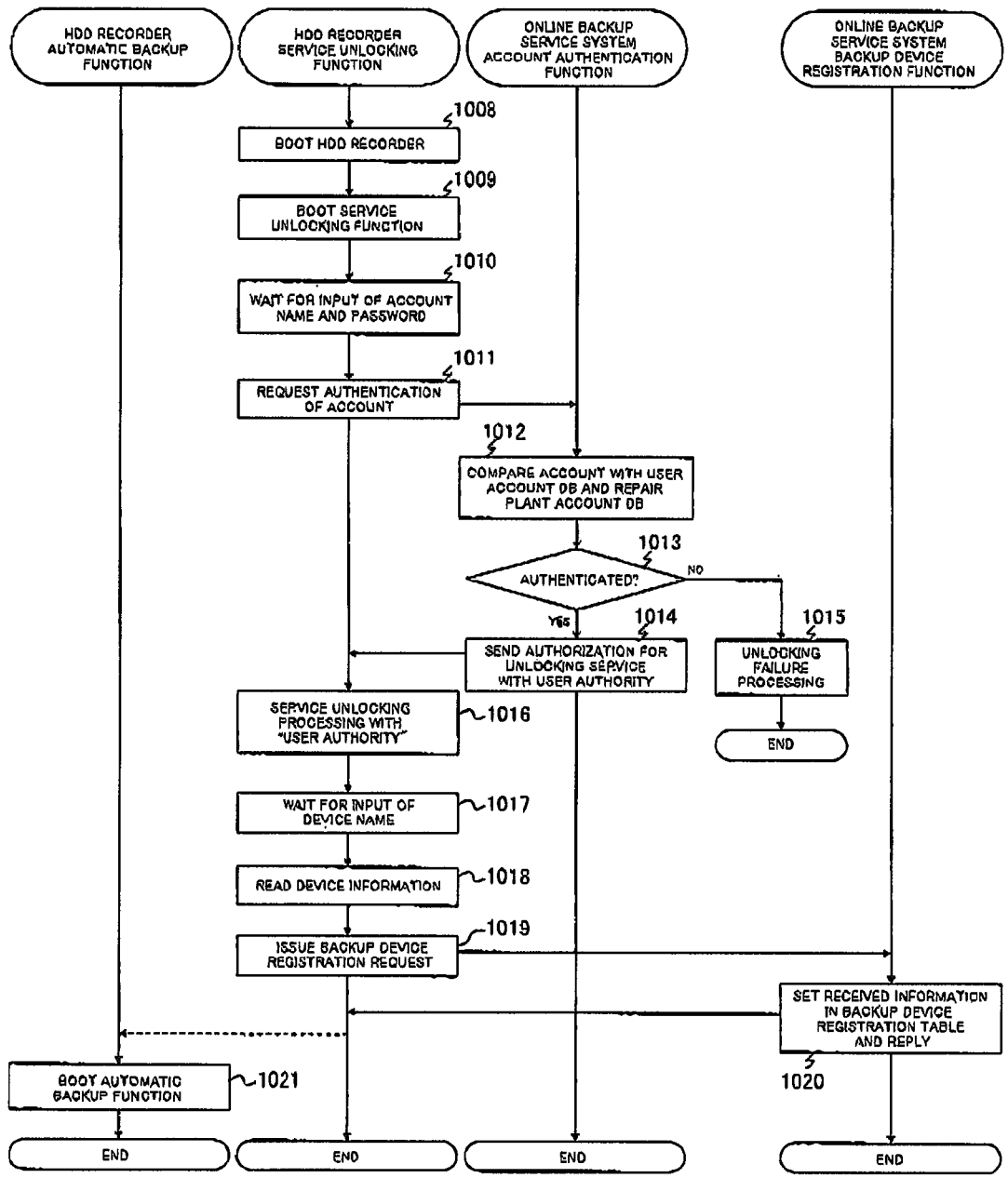
FIG. 11 is a flowchart explaining service registration processing according to the first embodiment of the present invention.

The processing flow from registering the user account to starting the use of service is now explained with reference to FIG. 10 and FIG. 11.

Step 1001: Foremost, as shown in FIG. 10, the employee of the outlet store executes the user account registration request function with the outlet store PC 0101.

Step 1002: The employee of the outlet store inputs into the user account registration request function a user account name, a user name, an address, a telephone number, an email address of the user's mobile phone or the like, and presses the submit button.

Step 1003: The user account registration request function communicates with the online backup service system 0128 via the Internet 0127, and sends the input information.

Step 1004: The user account registration function of the online backup service system 0128 registers the received information in the user account DB 0140, and decides the initial password for authenticating the newly created user account. The initial password is registered in the user account DB, and then the initial password is sent to the outlet store PC 0101.

Step 1005: The user account registration request function of the outlet store PC 0101 notifies the employee of the outlet store that the registration is complete by displaying such completion of registration on the PC screen.

Step 1006: The user account registration request function executes the account and initial password printing function, and delivers the user account name and the initial password as parameters for execution.

Step 1007: The account and initial password printing function prints the user account name and the initial password from the printer ancillary to the PC 0101.

Step 1008: Subsequently, as shown in FIG. 11, the user installs the purchased HDD recorder 0105 in one's home, and boots the HDD recorder 0105. Here, the processing from Step 1008 to Step 1019 may also be performed at the outlet store. This will save the trouble of the user.

Step 1009: The user uses a remote control to execute the service unlocking function of the HDD recorder 0105 (data restoration service in the event of the HDD recorder malfunctioning). If the status of the service unlocking information is already set to "service unlocking," this function is not executed.

Step 1010: The user views the paper that he/she received from the outlet store, and inputs the user account name and the initial password in the service unlocking function. If there are a plurality of online backup services and it is possible to select an arbitrary service among a plurality of services with one HDD recorder 0105, a menu for selecting the service provider to which the user subscribed can be presented as this timing to allow the user to select the service. For example, if different service providers are providing online backup services, there are cases where the purchaser of the HDD recorder is able to select a service among a plurality of backup services for subscription based on the difference in the service content (i.e., difference in price). In the foregoing case, a menu for selecting the service provider to which the user subscribed at Step 1010 can be presented to allow the user to select one's desired service.

Step 1011: The service unlocking function communicates with the online backup service system 0128 via the Internet 0127, sends the input user account name and password, and requests the authentication of the account. Here, let it be assumed that the DNS name and the like required for communicating with the online backup service system 0128 are set in the HDD recorder 0105 in advance at the time of product shipment. If this setting is not provided, the DNS name is input at Step 1009 and such DNS name is used for communication. DNS (Dynamic Name System) is a database system for associating the host IP and the host name on the Internet.

Step 1012: The account authentication function of the online backup service system 0128 compares the sent account name and password with the subject matter of the user account DB 0140 and the repair plant account DB 0139. Here, if the account name sent to the user account DB 0140 exists, the service unlocking based on user authority is permitted. If the account name sent to the repair plant account DB 0139 exists, the service unlocking based on repair plant authority is permitted.

Step 1013: If authentication is successful at Step 1012, the process proceeds to Step 1014. If authentication is unsuccessful, the proceeds to Step 1015.

Step 1014: If authentication is successful in the user account DB 0140, the account authentication function of the online backup service system 0128 returns a reply for permitting service unlocking based on user authority to the HDD recorder 0105. The case where authentication is permitted in the repair plant account DB 0139 will be explained in the restoration processing, and the following only explains a case where the authentication is successful based on user authority.

Step 1015: If the authentication ends in a failure, the unlocking failure processing of urging the user to input the account name and the password once again is performed.

Step 1016: If the service unlocking function of the HDD recorder 0105 receives a reply for permitting service unlocking, "user" is set as the authority of the service unlocking information, "service unlocked" is set as the status, and the account name input by the user is set as the account name.

Step 1017: The service unlocking function of the HDD recorder 0105 requests the user to input the device name of the backup target appliance using a screen display or the like. The service unlocking function of the HDD recorder 0105 sets the input device name as the service unlocking information.

Step 1018: The service unlocking function of the HDD recorder 0105 reads device information including the manufacturer name, model name and product serial number recorded in the ROM or the like of the HDD recorder 0105.

Step 1019: The service unlocking function of the HDD recorder 0105 issues a backup device registration request to the online backup service system 0128.

Step 1020: The backup device registration function of the online backup service system 0128 adds the received information to the backup device registration table, and thereby replies to the HDD recorder 0105.

Step 1021: The automatic backup function of the HDD recorder 0105 is operated when the service unlocking information is changed to "service unlocked."

(C) Automatic Backup Processing

The automatic backup processing automatically backs up the data in the HDD recorder 0105 to the online backup service system 0128.

The automatic backup processing is realized by the following functions working together. The HDD recorder 0105 includes a data recording function and an automatic backup function. The data recording function is a function for storing the received TV program as data in the storage, and managing the list of data stored in the storage with the data management table. The automatic backup function is a function for backing up data by sending the data newly stored in the storage of the HDD recorder 0105 to the online backup service system 0128 via the Internet 0127.

The online backup service system 0128 includes a backup processing function. The backup processing function is a function for storing the data sent from the HDD recorder 0105 as backup data in a storage, and managing when and where the data of which user account has been backed up with the backup catalog 0137.

Figure 12:
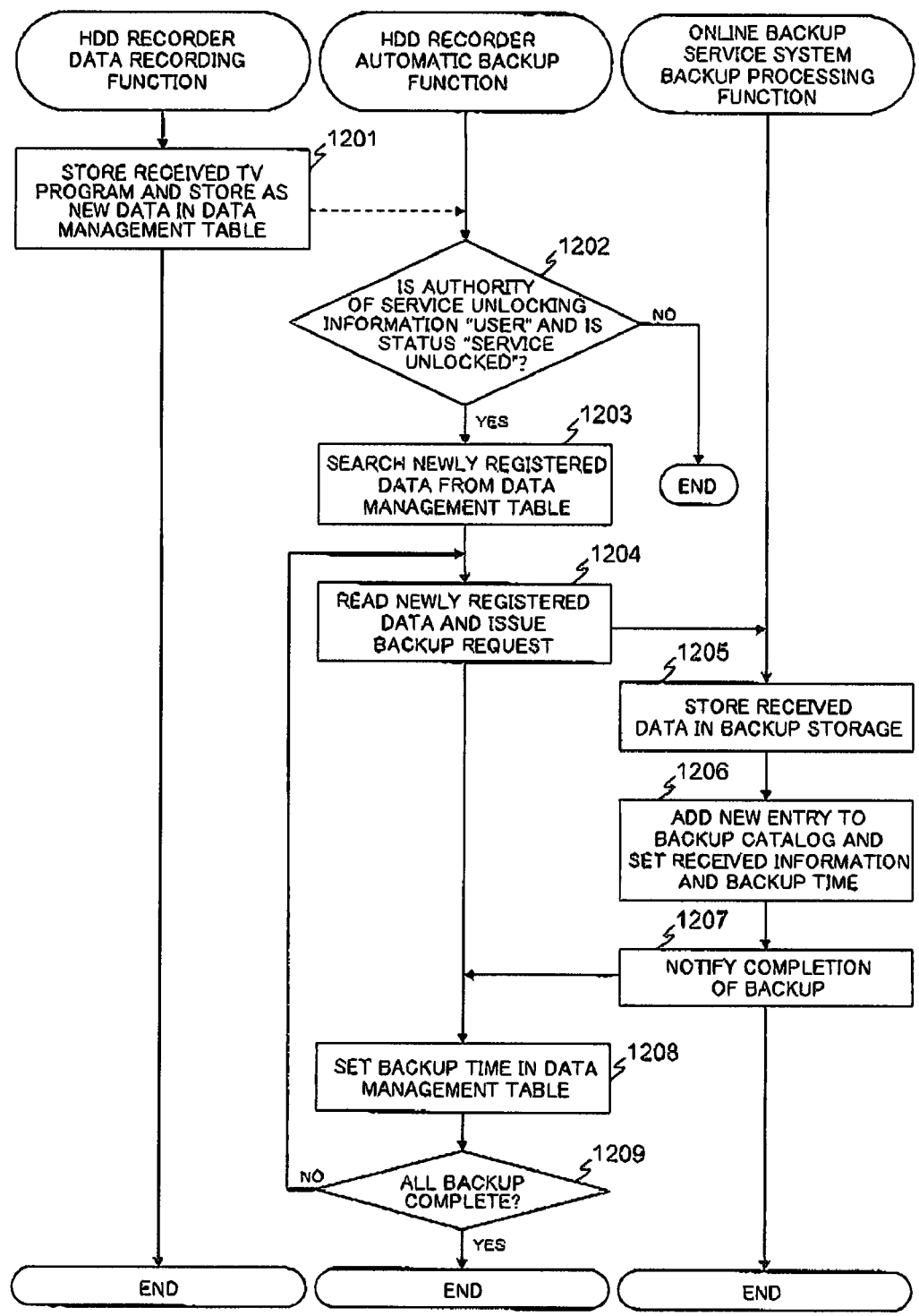
FIG. 12 is a flowchart explaining automatic backup processing according to the first embodiment of the present invention.

The processing flow of the automatic backup processing is now explained with reference to FIG. 12.

Step 1201: The data recording function of the HDD recorder 0105 stores the received TV program in a storage, and registers this as new data in the data management table 0112. The recorded program name is set as the title name of the data management table 0112, the time that the recording was started is set as the recording date, the length of the recording time is set as the recording time, "ON (unviewed)" is set as the unviewed flag, program explanatory information of EPG information is set as the program description, and information unique to the HDD recorder 0105 is set as the product proprietary information. The data location determines the file name or data storage position upon recording data in the internal storage of the HDD recorder 0105 before the program recording start [time], and such information is set. Whether the data is new data is differentiated by setting "Unimplemented" in the backup time of the data management table 0112.

Step 1202: The automatic backup function of the HDD recorder 0105 is periodically booted when the authority of the service unlocking information is "user" and the status is "service unlocked."

Step 1203: The automatic backup function of the HDD recorder 0105 refers to the data management table 0112 and searches for new data.

Step 1204: If new data exists, the automatic backup function of the HDD recorder 0105 reads the new data from the storage, and sends the user account name, the device name, metadata of data (from the title name to the product proprietary information of the data management table) and the data body as a set to the online backup service system 0128 via the Internet 0127.

Step 1205: The backup processing function of the online backup service system 0128 stores the received data in the backup storage. Upon recording data in the backup storage, the file name or the data storage position information concerning the data is decided.

Step 1206: The backup processing function of the online backup service system 0128 creates a new entry in the backup catalog 0137, sets the user account name, the device name, and information from the title name to the product proprietary information with the information received from the HDD recorder 0105, sets the time that the backup request was received as the backup time, set the file name decided at Step 1206 as the data location, and sets the file size as the data size. At this timing, the data volume backed up with the user account may also be added to the billing management table 0138.

Step 1207: The backup processing function of the online backup service system 0128 notifies the completion of backup to the HDD recorder 0105.

Step 1208: The automatic backup function of the HDD recorder 0105 sets the current time as the backup time of data in which the backup thereof to the data management table 0112 was completed.

Step 1209: The automatic backup function of the HDD recorder 0105 repeats Step 1202 to Step 1208 until there is no more new registered data.

(D) Data Restoration Processing

If the HDD recorder 0105 malfunctions, the failed HDD recorder 0105 is sent to the repair plant. If the HDD malfunctions, data recorded in the HDD will be lost. The data restoration processing recovers the data backed up in the online backup service system 0128 by the owner of the HDD recorder 0105 to the recovery.

The data restoration processing is realized by the following functions working together. The repaired HDD recorder 0116 includes a service unlocking function, and a data restoration function. The service unlocking function is a function for the user to start using the automatic backup service and the data restoration service. The data restoration function is a function for storing the backup data read from the online backup service system 0128 in the storage of the repaired HDD recorder 0116.

The online backup service system 0128 includes an account authentication function, a restoration processing function, and a restoration notification function. The account authentication function is a function for the employee of the repair plant to authenticate the repair plant account upon performing data restoration. The restoration processing function is a function for sending all data backed up with the designated user account to the repaired HDD recorder 0116. The restoration notification function is a function for contacting the owner of the HDD recorder 0105 that the restoration is complete after the data has been restored in the repaired HDD recorder 0116.

The mobile phone of the owner of the HDD recorder 0105 owner includes an email sending and receiving function. The email sending and receiving function is a function for receiving a restoration notification email sent from the online backup service system 0128.

Figure 13:
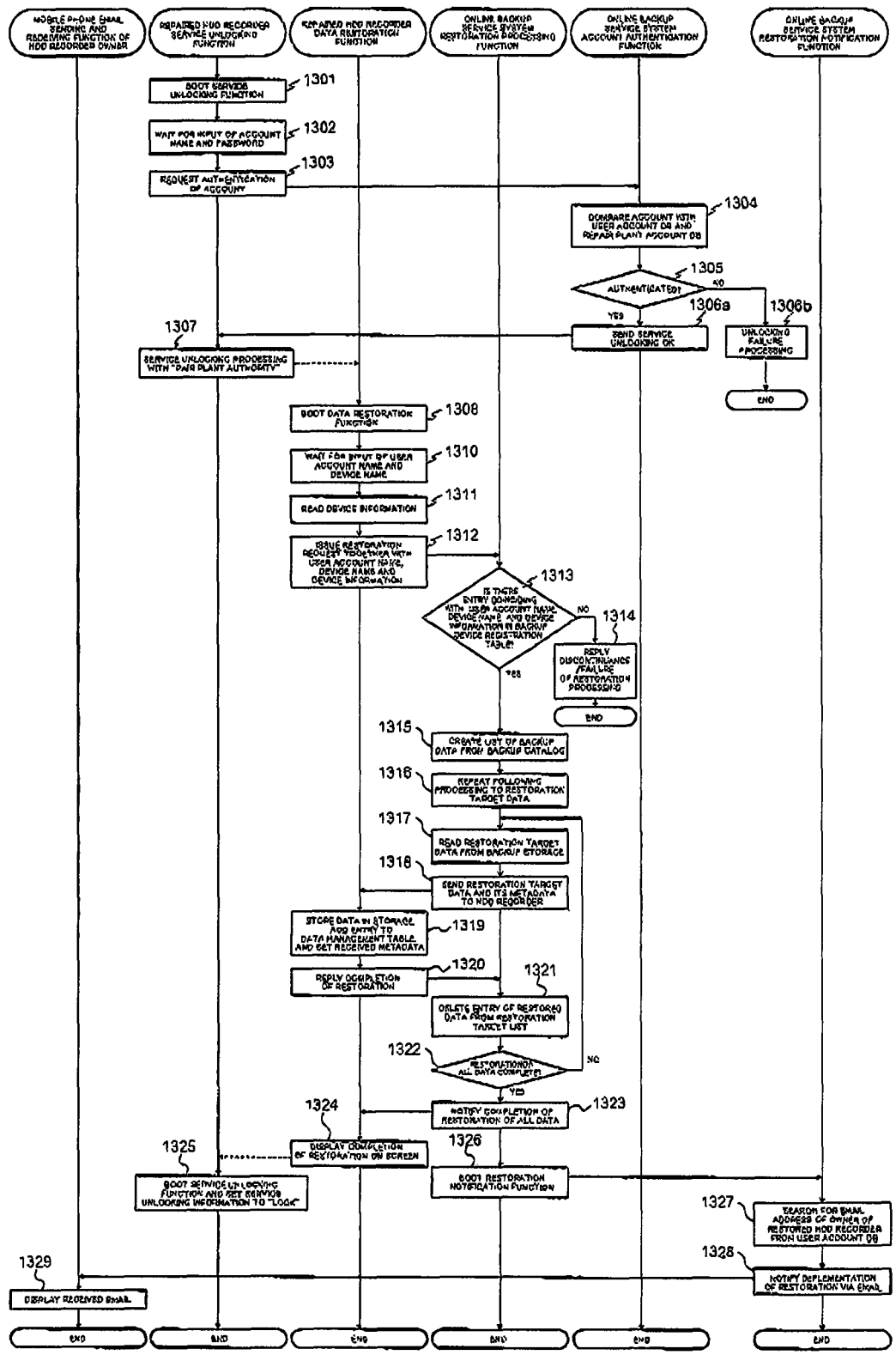
FIG. 13 is a flowchart explaining restoration processing according to the first embodiment of the present invention.

The processing flow of the data restoration processing is now explained with reference to FIG. 13. Nevertheless, the repaired HDD recorder 0116 does not contain any data, no data has been registered in the data management table 0124, the authority, account name and device name among the service unlocking information are left blank, and the status is set to "service locked."

Step 1301: The employee of the repair plant boots the repaired HDD recorder 0116, and executes the service unlocking function. If the status of the service unlocking information is already "service unlocked," this function is not executed.

Step 1302: The employee of the repair plant inputs the repair plant account name, and the repair plant account password in the service unlocking function. Here, a special input screen for use in repairs that is different for use by general users may also be prepared.

Step 1303: The service unlocking function of the repaired HDD recorder 0116 sends the input information to the online backup service system 0128.

Step 1304: The account authentication function of the online backup service system 0128 compares the sent account name and password with the contents of the user account DB 0140 and the repair plant account DB 0139. Here, if the account name sent to the user account DB 0140 exists, the service unlocking based on user authority is permitted. If the account name sent to the repair plant account DB 0139 exists, the service unlocking based on repair plant authority is permitted.

Step 1305 and Step 1306*a*: If authentication is successful at repair plant account DB 0139, the account authentication function of the online backup service system 0128 returns a reply permitting the service unlocking based on repair plant authority to the HDD recorder 0116. The case where authentication is permitted in the user account DB 0140 will be explained in the service registration processing, and the following only explains a case where the authentication is successful based on repair plant authority.

Step 1305 and Step 1306*b*: If the authentication ends in a failure, the unlocking failure processing of urging the user to input the account name and the password once again is performed.

Step 1307: If the service unlocking function of the HDD recorder 0116 receives a reply for permitting service unlocking, "repair plant" is set as the authority of the service unlocking information, and "service unlocked" is set as the status.

Automatic backup of the HDD recorder 0116 is not executed with these conditions, and only the restoration function is booted.

Step 1308: The employee of the repair plant executes the data restoration function of the repaired HDD recorder 0116.

Step 1310: The employee of the repair plant inputs the user account name and the device name into the data restoration function of the repaired HDD recorder 0116. The restoration function of the HDD recorder 0116 sets the input user account name and device name as the service unlocking information. The user account name and device name are designated using the information used by the user in the HDD recorder 0105 before repair.

Here, the user account name and device name are used by the online backup service system 0128 for deciding to which HDD recorder the data is to be restored. If the user lost the user account name or device name, a method of deciding which HDD recorder the data is to be restored may be adopted by using the user's name and address, the product's manufacturer name, model number, serial number and the like.

Step 1311: The service unlocking function of the HDD recorder 0116 reads device information including the manufacturer name, model name and product serial number recorded in the ROM or the like of the HDD recorder 0116.

Step 1312: The data restoration function of the repaired HDD recorder 0116 issues a data restoration request to the online backup service system 0128 and additionally sends the user account name, device name, and device information.

Step 1313: When the restoration processing function of the online backup service system 0128 receives the restoration request, it refers to the backup device registration table 0141, and checks whether there is an entry where the user account name, device name, and device information coincides. However, the device name and the serial number do not necessarily have to coincide.

The embodiment may be such that, among the entries of the user account DB 0140, the name, address or the like is used to specify the user account name, and the restoration is permitted when the manufacturer name and the model number of the restoration target appliance coincide. This embodiment explains a case where restoration is permitted only with the same model of the same manufacturer In addition, at this step, for the purpose of preventing unauthorized restoration, it is possible to only permit restoration when the manufacturer name of the repair target appliance and the manufacturer name in the list of manufacturers of the repair plant coincide.

Step 1314: If there is no entry corresponding to the backup device registration table 0141, the restoration processing function of the online backup service system 0128 discontinues the restoration processing, and replies a restoration failure to the HDD recorder 0116.

Step 1315: The online backup service system 0128 refers to the backup catalog 0137, and creates a list of data backed up with the designated user account and device name.

Step 1316: The restoration processing function of the online backup service system 0128 repeats Step 1312 onward to each restoration target data based on this data list. Here, it is not necessary to restore all restoration target data listed in the data list. Among the restoration target data, for example, it is possible to restore only the unviewed data, and restore the remaining data in the background after the HDD recorder 0105 is installed in the household.

This can be realized by the online backup service system 0128 storing information on which data has been restored. In a separate example, it is possible to restore only the popular data. Popular data as used herein may be determined on whether the TV program has a high viewer rating. The viewer rating information can be acquired from a viewer rating research company and matched with the metadata of the restoration target data to specify the popular data.

Step 1317: The restoration processing function of the online backup service system 0128 reads the restoration target data from the backup storage.

Step 1318: The restoration processing function of the online backup service system 0128 sends the read data and the metadata (information from the title name to the product proprietary information, and the backup time) of the data recorded in the backup catalog 0137 to the repaired HOD recorder 0116. If the user is to also be billed for the restoration, the restoration data volume managed with the billing management table 0138 may be added at this timing.

Step 1319: The data restoration function of the repaired HDD recorder 0116 writes the received data in the internal storage of the HDD recorder 0116, and registers such data in the data management table 0124. Information from the title name to the product proprietary information, and the backup time of the data management table 0124 is set based on the metadata received from the online backup service system 0128.

Step 1320: The data restoration function of the repaired HDD recorder 0116 notifies the storage of data to the online backup service system 0128.

Step 1321: The restoration processing function of the online backup service system 0128 deletes the entry of the restored data from the data list.

Step 1322: The restoration processing function of the online backup service system 0128 repeats Step 1312 to Step 1316 to all data in the data list.

Step 1323: When all data restoration is complete, the restoration processing function of the online backup service system 0128 notifies the completion of data restoration to the repaired HDD recorder 0116.

Step 1324: The data restoration function of the repaired HDD recorder 0116 notifies the completion of all data restoration to the employee of the repair plant with a screen display or the like.

Step 1325: The employee of the repair plant uses the service unlocking function of the repaired HDD recorder 0116 to clear the authority and account name of the service unlocking information, and sets the status to "service locked." Instead of the user using the service unlocking function, the service unlocking function of the repaired HDD can include a clear function for automatically clearing the authority and account of the service unlocking information. In order to use the automatic backup service, the user inputs the user account name and password once again upon booting the HDD recorder 0116.

Step 1326: After the completion of restoration, the restoration processing function of the online backup service system 0128 boots the restoration notification function of the online backup service system 0128.

Step 1327: The restoration notification function of the online backup service system 0128 searches for the email address of the service user being managed in correspondence with the restored user account name from the user account DB 0140.

Step 1328: The restoration notification function of the online backup service system 0128 sends an email to the service user. The subject matter of the email includes the restored time, company name of the repair plant, and list of restored data.

Step 1329: The mobile phone of the owner of the HDD recorder 0105 (0116) displays the email received from the online backup service system 0128, and notifies the user that the restoration has been performed.

In the restoration processing, instead of notifying the user via email after the completion of restoration, an email may be sent to the user at Step 1313 for seeking the permission of restoration before starting the restoration processing. In the foregoing case, the online backup service system 0128 refers to the email address corresponding to the user account from the user account DB 0140, and thereby sends an email to the user. The email indicates the following message, "Please reply to this email if you wish to start data restoration," The online backup service system 0128 waits for the email reply from the user for a given period of time, and continues the restoration processing only when there is such a reply. Instead of returning an email, the permission for restoration may also be confirmed by the user clicking a link in the email.

At Step 1313 of the restoration processing, if data restoration is to be performed to a different product of a different manufacturer, the format and product proprietary information of data between the products will differ. Thus, before the restoration processing function of the online backup service system 0128 sends the data read at Step 1318 to the HDD recorder 0116, the data format is converted into the file format of the HDD recorder 0116 of the restoration destination.

Thus, the online backup service system 0128, as shown in FIG. 19, manages an inter-product correspondence table showing which products 1901, 1902 are corresponding to what file format 1903, and the correspondence 1904 the product proprietary information is in among the products. As an example of the correspondence of product proprietary information, for instance, in a case where the protection configuration information of a content is managed using a tag referred to as "protection information" in product A, and similar information is managed using a tag referred to as "protective information" in product B, both tags are associated, and, when restoring the data backed up in product A to product B, the subject matter of the "protective information" tag is set to the "protection information" tag in the product proprietary information, and the product proprietary information can be thereby restored in the product B. If the user is to be billed additionally for the data restoration of a product of a different manufacturer, the additional cost is added to the billing management table 0138.

At Step 1313 of the restoration processing, the restoration data may be encrypted with a public key corresponding to the user account and then restored in the repaired HDD recorder 0116, and it is possible to prevent the employee of the repair plant from viewing the data by the user decoding the data using the user's private key upon playing back the data from the HDD recorder 0116. In this case, the user's public key is registered in the user account DB 0140 of the online backup service system 0128 at the time of service registration, and a private key, for instance, can be managed as a new item of the service unlocking information by the HDD recorder.

The timing of implementing the restoration processing is not limited to the point in time that the HDD recorder 0105 is repaired, and another embodiment may be adopted where data is restored to a new HDD recorder by the repair plant at the point in time that it is discovered that the HDD recorder 0105 may malfunction, and replacing the HDD recorder 0105 with the new HDD recorder before or immediately after the malfunction of the HDD recorder 0105. In this case, the repair plant or the online backup service provider acquires the Smart information of the internal HDD from the HDD recorder 0105 installed in the household and determines whether a malfunction is about to occur.

For example, it is determined that the malfunction is about to occur when the HDD read error count exceeds a predetermined threshold value. When it is determined that a malfunction has occurred, data backed up by the user is restored in the same model as the HDD recorder owned by the user. If the HDD recorder 0105 owned by the user malfunctions, after confirming that all backup data has been restored to the new HDD recorder by comparing the data management table 0112 of the HDD recorder 0105 and the backup management table of the online backup service system 0128, the new HDD recorder is sent to the user, and the user returns to the failed HDD recorder. It is thereby possible to shorten the period that the recorded data cannot be temporarily viewed due to the repair of the HDD recorder.

According to this embodiment, when recovering the data of the repaired HDD recorder 0105 (0116) using the data backed up in the online backup service system by a third party, it is possible to mitigate the risk of the unauthorized referral or use of the backup data by a third party. It is thereby possible to mitigate the risk of the unauthorized referral or use of the backup data upon restoring the backup data to the electronic appliance. Here, by the information service unit confirming whether to implement the restoration based on information such as an email, restoration will be implemented only when the restoration is permitted, and it is thereby possible to more reliably mitigate the risk of the unauthorized referral or use of the backup data by a third party.

Second Embodiment

Figure 14:
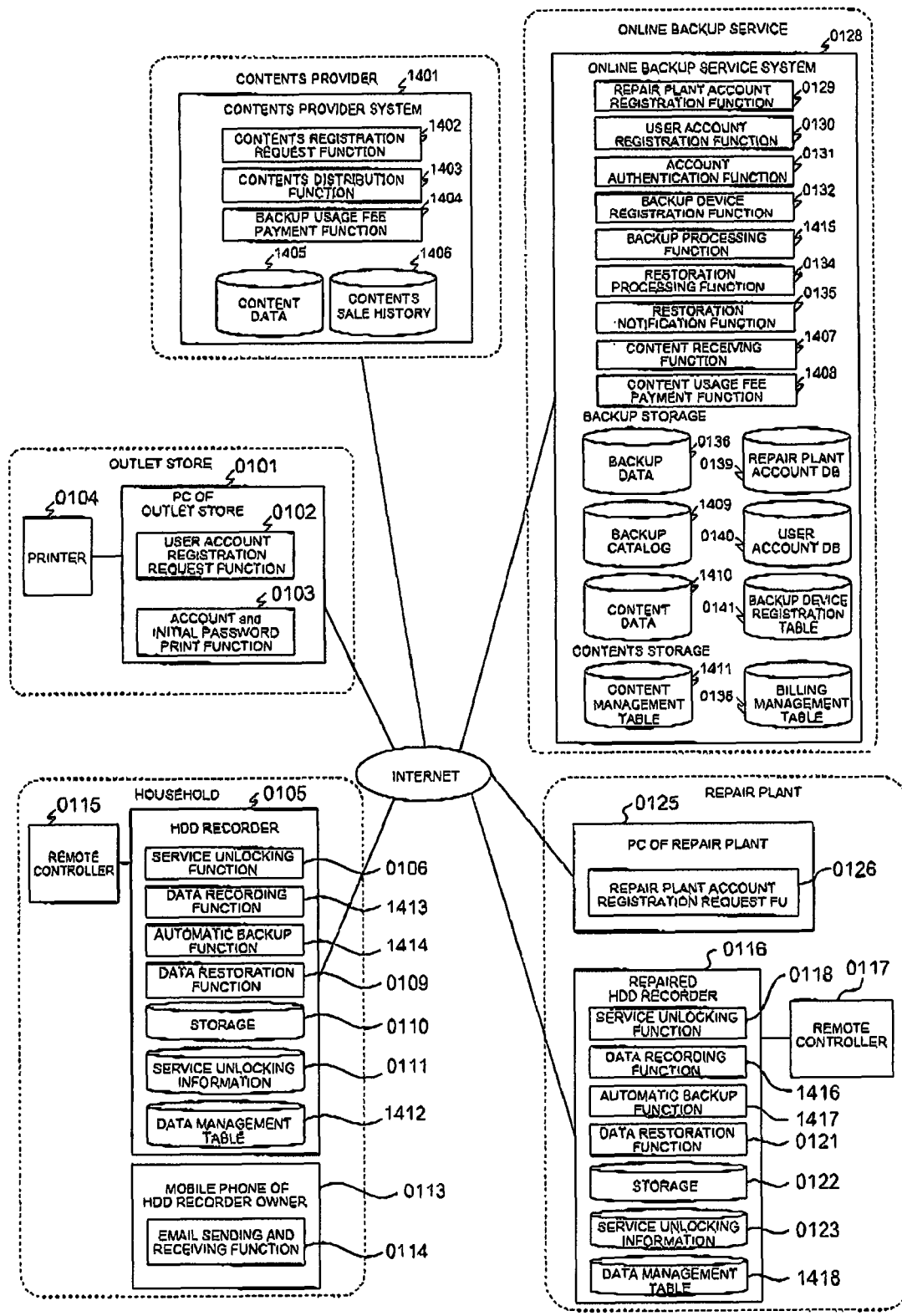
FIG. 14 is a system configuration diagram showing the second embodiment of the present invention.

FIG. 14 shows an embodiment of the HDD recorder repair service system with data restoration in the case of the content provider and the online backup service provider working together. The content provider is a vendor that provides fee-based contents such as TV programs, movies and music to users.

In this embodiment, the HDD recorder 0105 only backs up the metadata of the recorded data to the online backup service system 0128. The online backup service system 0128 preliminarily stores the contents owned by the content provider in a content storage 1405. The online backup service system 1208 restores the content specified with the metadata in the HDD recorder 0105 based on the metadata backed up by the HDD recorder 0105.

Whether the content provider pays the online backup service provider or the online backup service provider pays the content provider will differ depending on the business model.

For example, there may be a case where the content provider sells a content to a user at a price that is higher than the standard price by adding the restoration service to such content. In this case, the content provider pays a service usage fee to the online backup service provider based on the volume of the sold contents or the actual number of contents that were backed up. Here, the online backup service provider does not collect a usage fee from the user.

Meanwhile, if the online backup service provider is to collect a usage fee from the user, the online backup service providing vendor (online backup service provider) pays the content provider. The online service provider is able to reduce the network cost required for receiving the backup data and the storage capacity required for storing the backup data as a result of preliminarily storing the contents from the content provider in the backup storage. The online backup service provider pays the amount based on the reduction effect of the network cost and the storage capacity to the content provider.

An example of selling contents with the restoration service of the former is explained in order to describe a business model that is different from the first embodiment.

The difference between the first embodiment (FIG. 1) and the second embodiment (FIG. 14) is that a content provider system 1401 as a content providing unit for providing contents to the source of request has been added to the system configuration.

The content provider system 1401 includes a content registration request function 1402, a content distribution function 1403, and a backup usage fee payment function 1404. The content provider system 1401 includes a storage 1405 for storing the content data. The content registration request function 1402 is a function for transferring contents to the online backup service system 0128. The content distribution function 1403 is a function for selling contents to the HDD recorder 0105 and the mobile phone.

The backup usage fee payment function 1404 is a function for paying the online backup service system 0128 based on the number of contents sold with the restoration service or the actual number of contents that were backed up. The content provider system 1401 manages which contents were purchased by the user with the contents sales history 1406.

The automatic backup function 1414, 1417 of the HDD recorder 0105, unlike the first embodiment, backs up only the metadata of the new data to the online backup service system 0128. The data recording function 1413, 1416 performs slightly different processing so that coupon information is stored in the data management table. It also manages the coupon information associated with the content purchased from the content provider with the data management table 1412, 1418, and simultaneously transfers the coupon information when a content backup request is issued.

The online backup service system 0128, in addition to the first embodiment, includes a content reception function 1407 and a content usage fee payment function 1408. The content reception function 1407 is a function for receiving a content from the content provider system 1401, and recording such content in the content storage 1410. The content usage fee payment function 1408 is a function for paying the usage fee of the content to the content provider. The backup processing function 1415 backs up only the metadata. The restoration processing function restores the content read from the content storage 1410.

The online backup service system 0128 manages the coupon information designated by the user in the backup catalog 1409 so that the user will not be billed for the data backed up with the coupon. The online backup service system 0128 includes a content storage 1410 for storing contents and a content management table 1411 for managing contents.

The data purchased from the content provider with the restoration service is hereinafter referred to as a content, and will be differentiated from a TV program that was recorded free of charge but will be subject to a backup service cost.

As with the first embodiment, the backup target appliance is not limited to the HDD recorder 0105, and the present invention can be applied to any electronic appliance such as a mobile phone, a PDA or a PC that is capable of loading the foregoing functions. The Moreover, there is no particular limitation in the backup target data upon applying the present invention and, in addition to TV programs, the backup target data may be music or emails, address books, files or the like.

FIG. 15 shows an example of the data management table of the HDD recorder 0105 according to the second embodiment. The difference with the first embodiment is in that an item for managing the coupon information 1509 has been added. The coupon information 1509 stores the coupon information received from the content provider system 1401 at the time the user purchased the content.

The coupon information records encrypted information of the ID of the sold content, period of providing the restoration service (expiration date), serial number of the coupon, and, if necessary, the user account name. Thus, the user is not able to falsify the coupon.

FIG. 16 shows an example of the backup catalog 1409 of the online backup service system 0128 according to the second embodiment. The difference with the first embodiment is that the items of coupon information 1612 and content ID 1613 have been added. The coupon information 1612 stores the copy of valid coupon information designated at the time of backing up the content.

The content ID 1613 records the ID of the content to be backed up as indicated in the coupon information. Here, the content ID 1613 is a globally unique content identifier that is decided by the content provider. In this embodiment, since backup data is not stored in the backup storage regarding the content that was backed up using valid coupon information, the data location 1610 and the size 1611 are invalid and indicated as N/A.

FIG. 17 shows an example of the content management table 1411 of the online backup service system 0128. This table is configured from a content ID 1701, a provider name 1702, an authorized coupon information list 1703, a data location 1704, and a size 1705. The content ID 1701 is the content identifier described above. The provider name 1702 is either the name or ID of the content provider handling the content. The authorized coupon information list 1703 is a list of valid coupon information that the content provider issued regarding that content. The data location 1704 records where in the content storage the content registered in the content provider system was stored with a file name or the like. The size 1705 is the size of the file storing the content.

In the second embodiment also, as with the first embodiment, the HDD recorder repair service system with data restoration is realized with (A) repair plant account registration processing, (B) service registration processing, (C) automatic backup processing, and (D) data restoration processing. Nevertheless, since the repair plant account registration processing and the service registration processing are the same as the first embodiment, the explanation thereof is omitted. Explanation of the data restoration processing is also omitted since it is the same as the first embodiment other than that the restoration processing of the online backup service system 0128 reads the restoration target data from the content storage based on the content storage, and not from the backup storage, at Step 1317 of FIG. 13 when storing the content.

Figure 18:
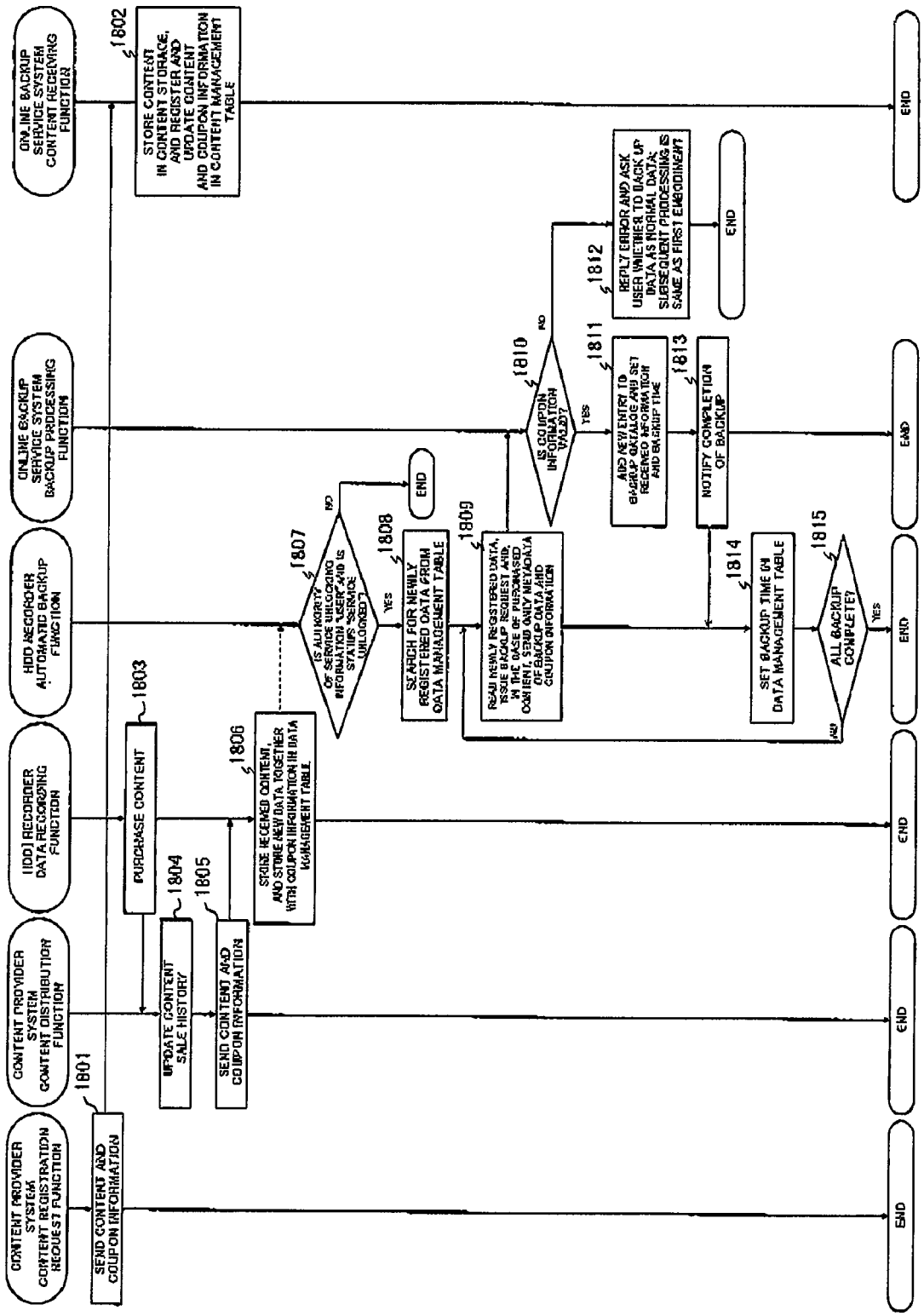
FIG. 18 is a flowchart explaining automatic backup processing according to the second embodiment of the present invention.

The processing flow of the automatic backup processing according to the second embodiment is now explained with reference to FIG. 18.

Step 1801: The content registration request function of the content provider system 1401 sends the content provider name, content subject to the restoration service, content ID, and coupon information to be issued to the user to the online backup service system 0128, and thereby issues a content registration request. Here, the content registration request is executed when the number of contents subject to restoration service increases or decreases, or when the coupon information is to be added, updated or deleted.

Step 1802: The content reception function of the online backup service system 0128 decides the file name for storing the content, and stores the received content in the content storage 1410. Subsequently, [content reception function of the online backup service system 0128] adds a new entry to the content management table 1411, and stores the designated content ID, provide name that issued the registration request, received coupon information, file name, and file size.

Step 1803: The user purchases the content from a portal site or the like provided by the content provide via the HDD recorder 0105. The data recording function of the HDD recorder 0105 sends a purchase request with the restoration service to the content provider system 1401.

Step 1804: The content distribution function of the content provider system 1401 stores information in the contents sales history regarding which user purchased which content. Since the contents sales history can be realized easily with conventional technology used in standard online shopping systems, the detailed explanation thereof is omitted.

Step 1805: The content distribution function of the content provider system 1401 sends the coupon information that offers free backup of the purchased content, and the content body to the HDD recorder 0105.

Step 1806: The data recording function of the HDD recorder 0105 stores the received content in the storage, and registers this as new data in the data management table 1412. The recorded program name is set as the title name of the data management table 1412, the time that the recording was started is set as the recording date, the length of the recording time is set as the recording time, "ON (unviewed)" is set as the unviewed flag, program explanatory information of EPG information is set as the program description, and information unique to the HDD recorder is set as the product proprietary information.

The data location determines the file name or data storage position upon recording data in the internal storage of the HDD recorder before the program recording start [time], and such information is set. Whether the data is new data is differentiated by setting "Unimplemented" in the backup time of the data management table 1412. The copy of coupon information received from the content provider system 1401 is stored in the coupon information of the data management table 1412.

Step 1807: The automatic backup function of the HDD recorder 0105 is periodically booted when the authority of the service unlocking information is "user" and the status is "service unlocked."

Step 1808: The automatic backup function of the HDD recorder 0105 refers to the data management table 1412 and searches for new data.

Step 1809: If new data exists, the automatic backup function of the HDD recorder 0105 reads the new data from the storage, and sends the user account name, the device name, metadata of data (from the title name to the product proprietary information of the data management table) and the coupon information as a set to the online backup service system 0128 via the Internet 0127. In the case of purchased contents, the data body is not sent.

Step 1810: The backup processing function of the online backup service system 0128 determines whether the received coupon information is valid by referring to the valid coupon information list of the content management table 1411. Here, the online backup service system 0128 may also make an inquiry to the content provider system 1401 regarding the validity of the coupon.

Step 1811: If the coupon information is valid, the backup processing function of the online backup service system 0128 creates a new entry in the backup catalog 1409, sets the user account name, the device name, and information from the title name to the product proprietary information with the information received from the HDD recorder 0105, sets the time that the backup request was received as the backup time, and sets the data and file size as "N/A." The coupon information received from the HDD recorder 0105 is copied to the coupon information. The content ID specified in the coupon information is set as the content ID.

Step 1812: If the coupon information is not valid at Step 1810, the backup processing function of the online backup service system 0128 notifies the HDD recorder 0105 that the coupon was invalid. The automatic backup function of the HDD recorder 0105 notifies the user that the content could not be backed up. The user may decide to back up the content as with a normally recorded TV data. This can be realized with the backup explained in the first embodiment.

Step 1813: The backup processing function of the online backup service system 0128 notifies the completion of backup to the HDD recorder 0105.

Step 1814: The automatic backup function of the HDD recorder 0105 sets the current time as the backup time in the data management table for data in which the backup is complete.

Step 1815: The automatic backup function of the HOD recorder 0105 repeats Step 1807 to Step 1814 until there is no more new registered data.

The backup usage fee payment function of the content provider system 1401 decides the usage fee based on the usage fee calculation formula determined between the content provider and the online backup service provider, and pays the usage fee to the online service provider based on the number of coupons issued to the user at the time the content was sold, and the coupon usage history sent by the online backup service system 0128.

If the online backup service is to collect a backup fee from the user, the content usage fee payment function of the online backup service system 0128 decides the usage fee based on the usage fee calculation formula determined between the content provider and the online backup service provider, and pays the usage fee to the online service provider based on the number of contents that were backed up or the number of contents that were restored.

According to this embodiment, it is possible to mitigate the risk of the unauthorized referral or use of the backup data by a third party when such third party is to recover the data of the repaired HDD recorder 0105 using the data backed up to the online backup service system 0128. It is also possible to realize a business model that coordinates with the content provider that sells contents with a data recovery service.

Further, even in cases where the backup target data is a content sold by a content provide as a third party, it is possible to realize a system where the content provider sells contents with a data recovery service, and create a business model that realizes a win-win situation for both the content provider and the online backup service provider.

Third Embodiment

The third embodiment explains a mode for realizing the migration of data from an old model to a new model that will be required when a user switches from an old model to a new model of a mobile phone or an HDD recorder at an outlet store.

Unlike the previous embodiments, the third embodiment explains a case taking a mobile phone as an example. Since the case of repairing a mobile phone at the repair plant has been covered in the first embodiment, it is not explained in the third embodiment. Moreover, since the backup of data of mobile phones has also been covered in the first embodiment, the following explanation is based on the premise that the data has already been backed up in the online backup service system.

Figure 20:
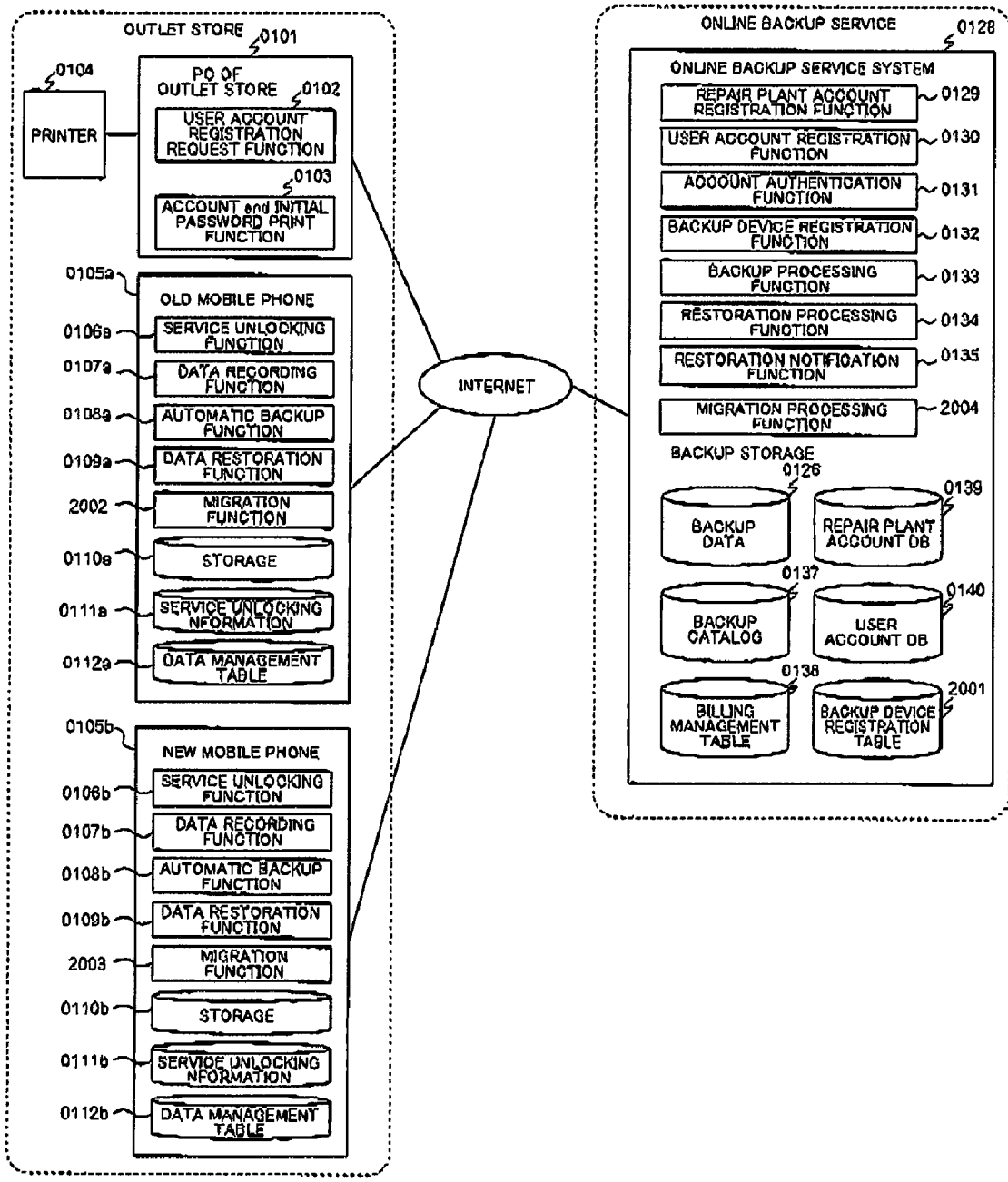
FIG. 20 is a system configuration diagram showing the third embodiment of the present invention.

FIG. 20 shows a system configuration diagram of the third embodiment. The difference with the first embodiment is in that an old model 0105*a* of the mobile phone and a new model 0105*b* of the mobile phone are connected via the Internet 0127. A case where data in the old model has already been backed up to the online backup service system 0128, and the user purchases a new model and the data in the old model is to be migrated to the new model is realized in the third embodiment.

Since many of the functions and management tables in the mobile phone and the online backup service system 0128 are the same as the first embodiment, only the differences are explained below.

The mobile phone in newly equipped with a migration function 2002, 2003. The online backup service system 0128 is newly equipped with a migration processing function 2002, 2003. The mobile phone includes a communication unit for conducting wireless communication with the mobile phone base station, an I/O button unit for operating the mobile phone, a display unit for displaying information, video and images, a speaker unit for playing back sounds and music, a storage apparatus such as an HDD (Hard Disk Drive) for recording music data and the like, a storage apparatus for storing the table structure data and database data described later (specifically, service unlocking information and a data management table) and programs that realize functions shown in the control flow (specifically, service unlocking function, data recording function, automatic backup function, data restoration function, migration function and so on), a processing unit (CPU) for processing data in the memory, received data and input data with the foregoing programs, and a communication line such as a bus for mutually connecting the foregoing components.

In this embodiment, the new model performs service unlocking using the user account registered in the old model. Subsequently, the status of the service unlocking information of the old model is changed to "data migration source," and the status of the service unlocking information of the new model is changed to "data migration destination." The new model issues a data migration request to the online backup service system 0128 for migrating data from the old model to the new model. The online backup service system 0128 restores the data backed up to the online backup service system 0128 in the new model only when the user accounts upon unlocking the service with the old model and the new model coincide, and the status of the service unlocking information is set to "data migration destination" for the new model and "data migration source" for the old model.

FIG. 21 shows an example of the backup device registration table 2001 of the online backup service system 0128. In comparison to the first embodiment, the service unlocking status 2107 is added as a new management item. Based on the service status, the online backup service system 0128 manages between which devices the data migration is to be performed. The change of service status is requested by the migration function of the mobile phone to the online backup service system 0128. During migration, the service status of the old model becomes "data migration source," and the service status of the new model becomes "data migration destination."

Figure 22:
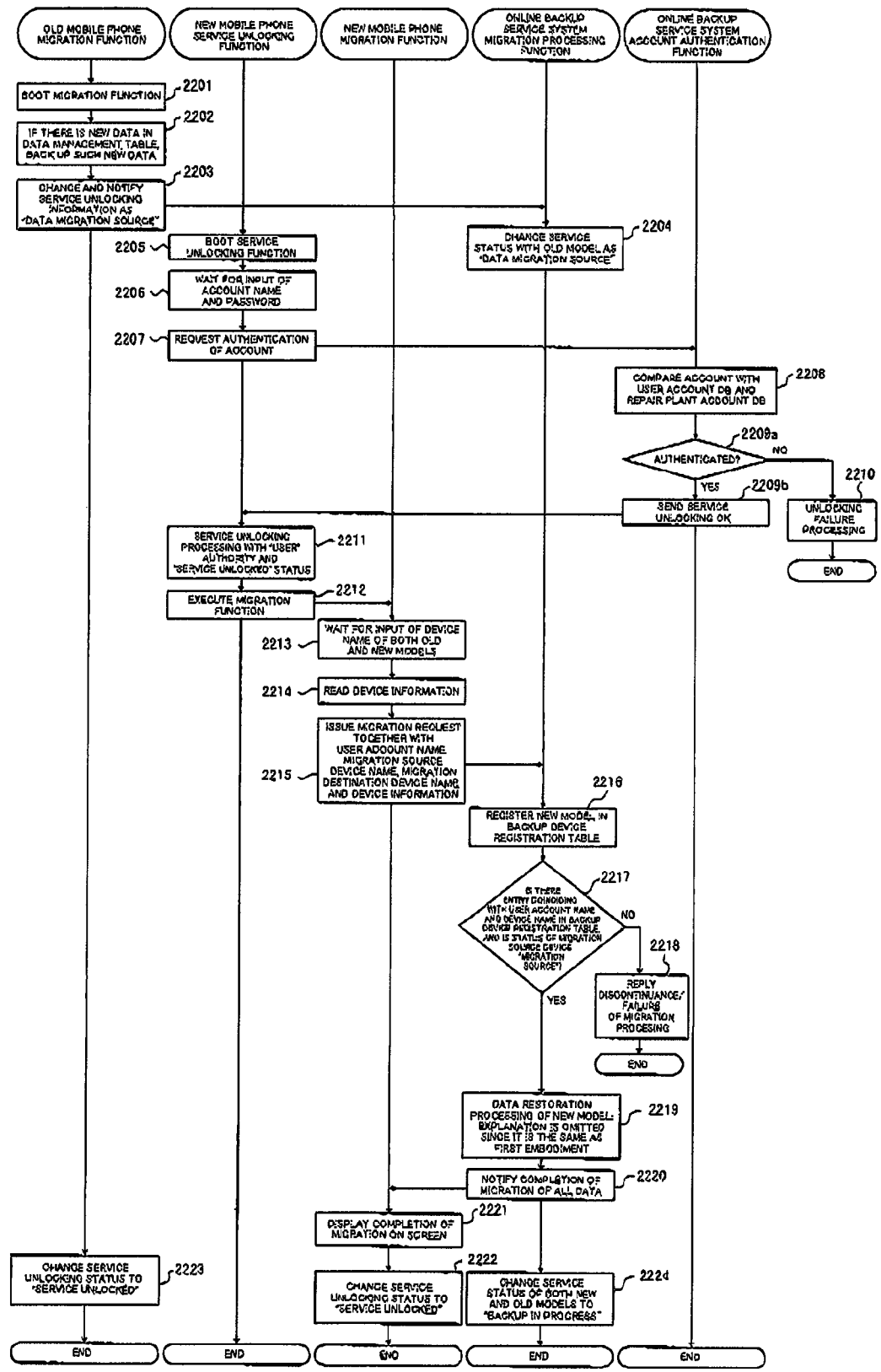
FIG. 22 is a flowchart explaining migration processing according to the third embodiment of the present invention.

FIG. 22 explains the migration processing. Nevertheless, no data is stored in the new mobile phone, no data is registered in the data management table, and authority, account name, and device name are cleared among the service unlocking information, and the status is set to "service locked."

Step 2201: The salesclerk of the outlet store asks the user to boot, or personally boots the migration function of the old mobile phone.

Step 2202: The migration function of the old mobile phone refers to the data management table, and determines whether there is new data that has not been backed up to the online backup service system 0128. If there is such data, the automatic backup function is executed to back up the new data to the online backup service system 0128.

Step 2203: The migration function of the old mobile phone sets the status of service unlocking information to "data migration source," and notifies the online backup service system 0128 of such change to the "data migration source." Here, the user account name and the device name of the old mobile phone are also designated.

Step 2204: The migration function of the online backup service system 0128 changes the service status of the registered appliance determined based on the designated user account and device name to "data migration source" among the entries of the backup device registration table.

Step 2205: The salesclerk of the outlet store asks the user to boot, or personally boots the service unlocking function of the new mobile phone.

Step 2206: The salesclerk of the outlet store asks the user to input the user account name and password, which were used for the backup to the old model, into the new model.

Step 2207: The service unlocking function of the new model issues an account authentication request to the online backup service system 0128.

Step 2208: The account authentication function of the online backup service system 0128 compares the sent account name and password with the subject matter of the user account DB and the repair plant account DB. Here, if the account name sent to the user account DB exists, the service unlocking based on user authority is permitted. If the account name sent to the repair plant account DB exists, the service unlocking based on repair plant authority is permitted.

Step 2209: If authentication with the user account DB is successful, the account authentication function of the online backup service system 0128 returns a reply permitting the service unlocking based on user authority to the new model.

Step 2210: If the authentication ends in a failure, the unlocking failure processing of urging the user to input the account name and the password once again is performed.

Step 2211: If the service unlocking function of the new model receives a reply for permitting service unlocking, "user" is set as the authority of the service unlocking information, "service unlocked" is set as the status, and the user account name input by the user is set as the account name.

Step 2212: The service unlocking function of the new model executes the migration function.

Step 2213: The migration function of the new model requests the user to input the device name of the new model and the device name of the old model using a screen display or the like. The migration function of the new model sets the input device name in the service unlocking information. Here, the device name of the new model is different from the device name of the old model.

Step 2214: The service unlocking function of the HDD recorder 0105 reads device information including the manufacturer name, model name and product serial number recorded in the ROM or the like of the new model.

Step 2215: The migration function of the new model issues a data migration request to the online backup service system 0128, and simultaneously sends the user account name, device name of the migration source, device name of the migration destination, and device information.

Step 2216: When the migration function of the online backup service system 0128 receives the migration request, it registers the device name and device information of the new model in the corresponding user account of the backup device registration table, and further sets the service status of the new model to "data migration destination."

Step 2217: The migration function of the online backup service system 0128 refers to the backup device registration table, and checks whether there is an entry in which the user account name and migration source device name coincide, and whether the service status of the migration source device is "data migration source."

Step 2218: If the conditions at Step 2217 are not satisfied, the migration processing function of the online backup service system 0128 discontinues the restoration processing, and replies a restoration failure to the new model.

Step 2219: Since the restoration processing of backup data to the new model by the migration processing function of the online backup service system 0128 is the same as the first embodiment, the explanation thereof is omitted.

Step 2220: If all data migration is complete, the migration processing function of the online backup service system 0128 notifies the completion of migration to the new model. If the user is to be additionally billed for this migration, the usage fee of the user account is added to the billing management table at this timing.

Step 2221: The migration function of the new model notifies the completion of migration of all data to the salesclerk of the outlet store with a screen display or the like.

Step 2222: The migration function of the new model returns the status of the service unlocking information to "service unlocked," and boots the automatic backup function.

Step 2223: The salesclerk of the outlet store uses the migration function of the old model to returns the status of the service unlocking information to "service locked."

Step 2224: The migration processing function of the online backup service system 0128 changes the service status of both the new and old models to "Backup in progress."

According to the present embodiment, when migrating data from the mobile phone of an old model to the mobile phone of a new model with backup data, it is not necessary to authenticate the worker to perform data migration or prepare for such data migration, and data can be easily migrated from the old model to the new model of the mobile phone at the outlet store using the backup data.

What is claimed is:

1. An electronic appliance service system configured by respectively connecting via a network an electronic appliance having a communication function and a function for recording information, an information service unit for backing up information concerning said electronic appliance, and an information recording unit for recording information in said electronic appliance, and which transfers information among said electronic appliance and said information service unit and said information recording unit, wherein said information service unit authenticates said electronic appliance in association with first authentication information based on information concerning said electronic appliance;

wherein said electronic appliance sends a backup request including said first authentication information to said information service unit as a backup request of information recorded in said electronic appliance;

wherein said information service unit discriminates backup request from said electronic appliance and backs up the information recorded in said electronic appliance;

wherein said information service unit authenticates said information recording unit in association with second authentication information as an electronic appliance under the control of said information recording unit based on information from said information recording unit;

wherein electronic appliance under the control of said information recording unit sends a restoration request including said second authentication information to said information service unit as a restoration request of information backed up in said information service unit in association with said first authentication information; and wherein said information service unit discriminates said restoration request and restores the information backed up in association with said first authentication information in electronic appliance under the control of said information recording unit.

2. The electronic appliance service system according to claim 1, wherein said information service unit discriminates the necessity of implementing restoration to electronic appliance under the control of said information recording unit, and, on condition that said discrimination result permits the implementation of restoration, restores the information backed up in association with said first authentication information in under the control of said information recording unit.

3. The electronic appliance service system according to claim 1, wherein said information service unit authenticates said electronic appliance in association with first authentication information based on information including a manufacturer name and a product number of said electronic appliance among the information concerning said electronic appliance.

4. The electronic appliance service system according to claim 1, wherein said information service unit changes the information backed up in association with said first authentication information in accordance with the specification of electronic appliance under the control of said information recording unit, and restores said changed information in electronic appliance under the control of said information recording unit.

5. An electronic appliance service system configured by respectively connecting via a network an electronic appliance having a communication function and a function for recording information, an information service unit for backing up information concerning said electronic appliance, an information recording unit for recording information in said electronic appliance, and a content providing unit for providing contents to a source of request, and which transfers information among said electronic appliance and said information service unit and said information recording unit and said content providing unit, wherein said information service unit authenticates said electronic appliance in association with first authentication information based on information concerning said electronic appliance;

wherein said electronic appliance sends a backup request including said first authentication information to said information service unit as a backup request of information recorded in said electronic appliance;

wherein said information service unit discriminates backup request from said electronic appliance and backs up metadata among the information recorded in said electronic appliance;

wherein said information service unit authenticates said information recording unit in association with second authentication information as an electronic appliance under the control of said information recording unit based on information from said information recording unit;

wherein electronic appliance under the control of said information recording unit sends a restoration request including said second authentication information to said information service unit as a restoration request of information backed up in said information service unit in association with said first authentication information; and wherein said information service unit discriminates said restoration request and retrieves a content corresponding to the metadata backed up in association with said first authentication information said first authentication information, and restores in electronic appliance under the control of said information recording unit.

6. The electronic appliance service system according to claim 5, wherein said information service unit and said content providing unit send and receive billing information that is associated with the transfer of said content.

7. An electronic appliance service system configured by respectively connecting via a network an electronic appliance having a communication function and a function for recording information, and an information service unit for backing up information concerning said electronic appliance, and which transfers information between said electronic appliance and said information service unit, wherein said information service unit authenticates said electronic appliance in association with first authentication information based on information concerning said electronic appliance;

wherein said electronic appliance sends a backup request including said first authentication information to said information service unit as a backup request of information recorded in said electronic appliance;

wherein said information service unit discriminates backup request from said electronic appliance and backs up the information recorded in said electronic appliance;

wherein said electronic appliance sends a migration request including said first authentication information to said information service unit as a migration request of information backed up in said information service unit in association with said first authentication information; and wherein, when said information service unit receives a migration request from a new electronic appliance that is different from said electronic appliance and discriminates said new electronic appliance to the data migration destination based on said migration request, [said information service unit] migrates information backed up in association with said first authentication information to said new electronic appliance.

8. An electronic appliance service system configured by respectively connecting via a network a first HDD recorder for recording a TV program in an internal storage, an online backup service system for backing up information recorded in said first HDD recorder, and an information recording unit for recording information in a repaired first HDD recorder, and which transfers information among said first HDD recorder and said online backup service system and said information recording unit;

wherein said online backup service system authenticates first HDD recorder based on first authentication information;

wherein said first HDD recorder backs up via the network the TV program recorded in said internal storage in online backup service system using said first authentication information;

wherein said online backup service system authenticates a second HDD recorder under the control of said information recording unit based on second authentication information;

wherein said second HDD recorder sends via the network a restoration request to online backup service system for restoring the TV program backed up in online backup service system using first authentication information in an internal storage of said second HDD recorder;

wherein said online backup service system discriminates said restoration request and restores the TV program backed up using said first authentication information in said second HDD recorder; and wherein said online backup service system issues an email notifying the completion of restoration to an email address of the owner of first HDD recorder associated with said first authentication information.

9. The electronic appliance service system according to claim 8, wherein said online backup service system issues an email inquiring whether to implement the restoration to the email address of the owner of first HDD recorder associated with said first authentication information before restoring said TV program in said second HDD recorder, and restores the TV program backed up using said first authentication information in said second HDD recorder only upon receiving an email reply from the email destination.

* * * * *